United States Patent
Uematsu et al.

(10) Patent No.: US 12,152,094 B2
(45) Date of Patent: Nov. 26, 2024

(54) MULTI-COMPONENT IONOMER

(71) Applicants: JAPAN POLYETHYLENE CORPORATION, Tokyo (JP); JAPAN POLYPROPYLENE CORPORATION, Tokyo (JP)

(72) Inventors: Masahiro Uematsu, Kanagawa (JP); Kohei Takamitsu, Kanagawa (JP); Tomohiko Satou, Mie (JP); Yoshika Yamada, Mie (JP)

(73) Assignees: JAPAN POLYETHYLENE CORPORATION, Tokyo (JP); JAPAN POLYPROPYLENE CORPORATION, Tokyo (JP)

(*) Notice: Subject to any disclaimer, the term of this patent is extended or adjusted under 35 U.S.C. 154(b) by 631 days.

(21) Appl. No.: 17/431,975

(22) PCT Filed: Feb. 27, 2020

(86) PCT No.: PCT/JP2020/008098
§ 371 (c)(1),
(2) Date: Aug. 18, 2021

(87) PCT Pub. No.: WO2020/179632
PCT Pub. Date: Sep. 10, 2020

(65) Prior Publication Data
US 2022/0135718 A1 May 5, 2022

(30) Foreign Application Priority Data

Mar. 4, 2019 (JP) .................. 2019-038768

(51) Int. Cl.
*C08F 210/02* (2006.01)
*C08F 4/80* (2006.01)
(Continued)

(52) U.S. Cl.
CPC .............. *C08F 210/02* (2013.01); *C08F 4/80* (2013.01); *C08F 220/06* (2013.01);
(Continued)

(58) Field of Classification Search
CPC .................. C08F 220/06; C08F 220/04; C08F 220/1804; C08F 222/04; C08F 2500/39;
(Continued)

(56) References Cited

U.S. PATENT DOCUMENTS 3,264,272 A 8/1966 Rees
4,956,418 A 9/1990 Tanaka et al.
(Continued)

FOREIGN PATENT DOCUMENTS

CN 107075005 A 8/2017
EP 0 115 190 A2 8/1984
(Continued)

OTHER PUBLICATIONS

Office Action for JP App. No. 2020-031808, dated Aug. 8, 2023 (w/ translation).
(Continued)

*Primary Examiner* — Rip A Lee
(74) *Attorney, Agent, or Firm* — Greenblum & Bernstein, P.L.C.

(57) ABSTRACT

A multi-component ionomer, wherein, in a multi-component copolymer (D) comprising, as essential constitutional units, a structural unit (A) derived from at least one selected from the group consisting of ethylene and an α-olefin containing 3 to 20 carbon atoms, a structural unit (B) derived from a monomer containing at least one selected from the group consisting of a carboxy group and a dicarboxylic anhydride group, and a structural unit (C) derived from a specific acyclic monomer, at least a part of at least one selected from the group consisting of a carboxy group and a dicarboxylic
(Continued)

anhydride group of the structural unit (B) is converted into a specific metal-containing carboxylate, and wherein a phase angle δ at which an absolute value G* of a complex modulus measured with a rotational rheometer is 0.1 MPa (G*=0.1 MPa) is from 50 degrees to 75 degrees.

10 Claims, 2 Drawing Sheets

(51) Int. Cl.
  *C08F 220/04* (2006.01)
  *C08F 220/06* (2006.01)
  *C08F 220/18* (2006.01)
  *C08F 4/70* (2006.01)
  *C08F 222/04* (2006.01)
(52) U.S. Cl.
  CPC ...... *C08F 220/18* (2013.01); *C08F 220/1804* (2020.02); *C08F 4/7031* (2013.01); *C08F 220/04* (2013.01); *C08F 222/04* (2013.01); *C08F 2500/10* (2013.01); *C08F 2500/34* (2021.01); *C08F 2500/36* (2021.01); *C08F 2500/39* (2021.01)
(58) Field of Classification Search
  CPC .... C08F 2500/36; C08F 2500/34; C08F 8/44; C08F 4/7031; C08F 4/80
  See application file for complete search history.

(56) References Cited

U.S. PATENT DOCUMENTS

| | | | | |
|---|---|---|---|---|
| 10,717,855 | B2* | 7/2020 | Hattori | C08L 23/06 |
| 11,084,957 | B2* | 8/2021 | Uematsu | C09J 7/20 |
| 11,168,166 | B2* | 11/2021 | Kobayashi | C08F 222/02 |
| 2017/0306134 | A1 | 10/2017 | Hattori et al. | |
| 2021/0061980 | A1* | 3/2021 | Satou | C08F 210/04 |
| 2022/0106471 | A1* | 4/2022 | Satou | C08F 8/12 |
| 2022/0242981 | A1* | 8/2022 | Aoki | C08G 61/08 |
| 2022/0251268 | A1* | 8/2022 | Yoshimoto | C08F 222/04 |

FOREIGN PATENT DOCUMENTS

| | | |
|---|---|---|
| JP | S59-133217 A | 7/1984 |
| JP | 2004-524418 A | 8/2004 |
| JP | 2016-79408 A | 5/2016 |
| WO | WO 02/079319 A2 | 10/2002 |

OTHER PUBLICATIONS

ISR for PCT/JP2020/008098, dated May 19, 2020 (w/ translation).
IPRP for PCT/JP2020/008098, dated Aug. 25, 2021.
EESR for EP App. No. 20767354.2, dated Mar. 25, 2022.
Office Action for CN App. No. 202080015774.5, dated Nov. 18, 2023 (w/ translation).
Office Action for CN App. No. 202080015774.5, dated Mar. 21, 2023 (w/ translation).

* cited by examiner

MULTI-COMPONENT IONOMER

TECHNICAL FIELD

The present invention relates to a multi-component ionomer.

BACKGROUND ART

An ethylene-based ionomer is a resin which contains an ethylene-unsaturated carboxylic acid copolymer as a base resin and in which intermolecular bonding is formed by a metal ion such as sodium and zinc. It is characterized by toughness, high elasticity, high flexibility, abrasion resistance, transparency and so on (Patent Literature 1). Commercially-available ionomer products are known to include "SURLYN (trade name)" (sodium salt and zinc salt of ethylene-methacrylic acid copolymer, developed by DuPont) and "HIMILAN (trade name)" (available from Dow-Mitsui Polychemicals Co., Ltd.)

As the ethylene-unsaturated carboxylic acid copolymer used in the conventionally-known ethylene-based ionomer, in particular, a polar group-containing olefin copolymer produced by polymerizing ethylene and a polar group-containing monomer such as (meth)acrylic acid by high-pressure radical polymerization method, is used. However, for the polar group-containing olefin copolymer produced by high-pressure radical polymerization method, the molecular structure is a structure in which many long chain branches and short chain branches are irregularly contained, and the structure has a problem of poor strength.

There is a report of another method for producing the polar group-containing olefin copolymer serving as the base resin of the ethylene-based ionomer, in which a copolymer of ethylene and t-butyl acrylate is produced by use of a late transition metal catalyst; the thus-obtained polar group-containing olefin copolymer is modified into an ethylene-acrylic acid copolymer by heating or acid treatment; and then the ethylene-acrylic acid copolymer is reacted with a metal ion to produce a binary ionomer (Patent Literature 2).

In Patent Literatures 3 and 4, a ternary ionomer that uses, as the base resin, a polar group-containing olefin copolymer produced copolymerization of ethylene, methacrylic acid and acrylic acid ester by the conventional high-pressure radical polymerization method, is reported as a multi-component ionomer. Also, it is suggested that the ionomer has improved low temperature properties and flexibility.

CITATION LIST

Patent Literatures

Patent Literature 1: U.S. Pat. No. 3,264,272
Patent Literature 2: Japanese Patent Application Laid-Open (JP-A) No. 2016-79408
Patent Literature 3: JP-A No. S59-133217
Patent Literature 4: Japanese translation of PCT International Application No. 2004-524418

SUMMARY OF INVENTION

Technical Problem

In Patent Literature 2, the polar group-containing olefin copolymer which is produced by use of the late transition metal catalyst and which has a substantially straight chain structure, is used as the based resin. Accordingly, the binary ionomer thus obtained is excellent in thermal properties, mechanical strength and so on. However, the ionomer has problems such as low flexibility and low transparency. Also in Patent Literature 2, there is no description of excellent adhesion performance to different kinds of highly-polar materials such as synthetic resin except for polyolefin, metal, and wood.

As a result of research conducted by the inventors of the present invention, as will be shown by comparative examples described later, it was found that when the polar group-containing olefin copolymer having a multi-branched structure produced by the conventional high-pressure radical polymerization method is used as the base resin, by converting a binary ionomer into a ternary ionomer, the strength is decreased while the flexibility is increased; thus, it is difficult for the ionomer produced by the conventional method to balance flexibility and strength.

In light of the above circumstances in the prior art, an object of the present invention is to provide a multi-component ionomer which is well-balanced between flexibility, strength and transparency and which has excellent adhesion performance to different kinds of highly-polar materials.

Solution to Problem

The inventors of the present invention found that by converting the multi-component ionomer having such a straight chain structure that the phase angle δ at which the absolute value G* of a complex modulus measured with a rotational rheometer is 0.1 MPa (G*=0.1 MPa) is from 50 degrees to 75 degrees and having a structural unit derived from a specific acyclic monomer, from a binary ionomer into a ternary or more component ionomer, it becomes a multi-component ionomer which has improved strength while improving flexibility and transparency, which is well-balanced between flexibility, strength and transparency and which has excellent adhesion performance to different kinds of highly-polar materials. Finally, the inventors achieved the present invention.

The multi-component ionomer of the present invention is a multi-component ionomer, wherein, in a multi-component copolymer (D) comprising, as essential constitutional units, a structural unit (A) derived from at least one selected from the group consisting of ethylene and an α-olefin containing 3 to 20 carbon atoms, a structural unit (B) derived from a monomer containing at least one selected from the group consisting of a carboxy group and a dicarboxylic anhydride group, and a structural unit (C) derived from an acyclic monomer represented by the following general formula (1), at least a part of at least one selected from the group consisting of a carboxy group and a dicarboxylic anhydride group of the structural unit (B) is converted into a metal-containing carboxylate containing at least one metal ion selected from the group consisting of Groups 1, 2 and 12 of the periodic table, and wherein a phase angle δ at which an absolute value G* of a complex modulus measured with a rotational rheometer is 0.1 MPa (G*=0.1 MPa) is from 50 degrees to 75 degrees:

(1)

where $T^1$ to $T^3$ are each independently a hydrogen atom, a hydrocarbon group containing 1 to 20 carbon atoms, a hydrocarbon group containing 1 to 20 carbon atoms and being substituted with a hydroxyl group, a hydrocarbon group containing 2 to 20 carbon atoms and being substituted with an alkoxy group containing 1 to 20 carbon atoms, a hydrocarbon group containing 3 to 20 carbon atoms and being substituted with an ester group containing 2 to 20 carbon atoms, a hydrocarbon group containing 1 to 20 carbon atoms and being substituted with a halogen atom, an alkoxy group containing 1 to 20 carbon atoms, an aryl group containing 6 to 20 carbon atoms, an ester group containing 2 to 20 carbon atoms, a silyl group containing 3 to 20 carbon atoms, a halogen atom or a cyano group, and $T^4$ is a hydrocarbon group containing 1 to 20 carbon atoms and being substituted with a hydroxyl group, a hydrocarbon group containing 2 to 20 carbon atoms and being substituted with an alkoxy group containing 1 to 20 carbon atoms, a hydrocarbon group containing 3 to 20 carbon atoms and being substituted with an ester group containing 2 to 20 carbon atoms, a hydrocarbon group containing 1 to 20 carbon atoms and being substituted with a halogen atom, an alkoxy group containing 1 to 20 carbon atoms, an aryl group containing 6 to 20 carbon atoms, an ester group containing 2 to 20 carbon atoms, a silyl group containing 3 to 20 carbon atoms, a halogen atom, or a cyano group.

In the multi-component ionomer of the present invention, a melting point (Tm) (° C.) observed by differential scanning calorimetry (DSC) may be from 50° C. to 140° C.

In the multi-component ionomer of the present invention, a number of methyl branches of the multi-component copolymer (D) calculated by $^{13}$C-NMR may be 50 or less per 1,000 carbon atoms.

In the multi-component ionomer of the present invention, the structural unit (C) contained in the multi-component copolymer (D) may be 0.1 mol % or more and 20.0 mol % or less.

In the multi-component ionomer of the present invention, the structural unit (B) contained in the multi-component copolymer (D) may be 2.0 mol % or more and 20.0 mol % or less.

In the multi-component ionomer of the present invention, the structural unit (A) may be a structural unit derived from ethylene.

In the multi-component ionomer of the present invention, $T^1$ to $T^3$ may be all hydrogen atoms.

In the multi-component ionomer of the present invention, $T^4$ may be an ester group containing 2 to 20 carbon atoms.

In the multi-component ionomer of the present invention, the multi-component copolymer (D) may be produced by use of a transition metal catalyst containing a transition metal of Groups 8 to 11 of the periodic table.

In the multi-component ionomer of the present invention, the transition metal catalyst may be a transition metal catalyst containing phosphorus sulfonic acid or phosphorus phenol ligand and nickel or palladium.

Advantageous Effects of Invention

According to the present invention, the multi-component ionomer which is well-balanced between flexibility, strength and transparency and which has excellent adhesion performance to different kinds of highly-polar materials, can be provided.

BRIEF DESCRIPTION OF DRAWINGS

In the accompanying drawings.

DESCRIPTION OF EMBODIMENTS

Figure 1:
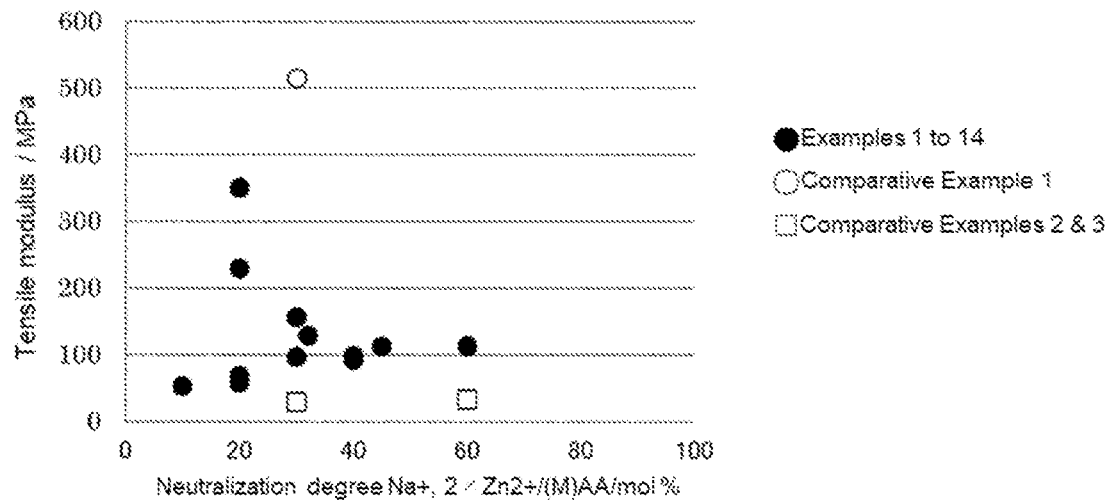
FIG. 1 is a view showing a relationship between the neutralization degree and tensile modulus (flexibility) of the ionomers of Examples 1 to 14 and Comparative Examples 1 to 3.

The multi-component ionomer of the present invention is a multi-component ionomer, wherein, in a multi-component copolymer (D) comprising, as essential constitutional units, a structural unit (A) derived from at least one selected from the group consisting of ethylene and an α-olefin containing 3 to 20 carbon atoms, a structural unit (B) derived from a monomer containing at least one selected from the group consisting of a carboxy group and a dicarboxylic anhydride group, and a structural unit (C) derived from an acyclic monomer represented by the following general formula (1), at least a part of at least one selected from the group consisting of a carboxy group and a dicarboxylic anhydride group of the structural unit (B) is converted into a metal-containing carboxylate containing at least one metal ion selected from the group consisting of Groups 1, 2 and 12 of the periodic table, and wherein a phase angle δ at which an absolute value G* of a complex modulus measured with a rotational rheometer is 0.1 MPa (G*=0.1 MPa) is from 50 degrees to 75 degrees.

Hereinafter, the multi-component ionomer of the present invention is explained in detail.

In the present Description, "(meth)acrylate" denotes "acrylate" or "methacrylate".

Also in the present Description, "to" which shows a numerical range is used to describe a range in which the numerical values described before and after "to" indicate the lower limit value and the upper limit value.

Also in the present Description, the multi-component copolymer means a terpolymer or more component copolymer containing at least one structural unit (A), at least one structural unit (B) and at least one structural unit (C).

Also in the present Description, the multi-component ionomer means the ionomer of a ternary or more component copolymer, which contains the structural unit (A), a structural unit (B') (in which at least a part of the structural unit (B) is converted into the metal-containing carboxylate) and the structural unit (C) and which may further contain the structural unit (B).

When the copolymer having the multi-branched structure produced by the conventional high-pressure radical polymerization method is used as the base resin, by converting a binary ionomer into a ternary ionomer, the breaking strength is decreased while the flexibility is increased.

Meanwhile, the multi-component ionomer of the present invention has the substantially straight chain structure, and it contains the structural unit (C) derived from the specific acyclic monomer besides the structural unit (A) and the structural unit (B') (in which at least a part of the structural unit (B) is converted into the metal-containing carboxylate). Accordingly, while inhibiting the chain of the structural unit (A) and decreasing the crystallinity, the deformation amount can be sufficiently increased to the extent that the breaking strength is increased compared to the case of the binary ionomer. Accordingly, the multi-component ionomer is estimated to be such that the breaking strength is increased while the flexibility and transparency are increased, thereby being well-balanced between flexibility, strength and transparency. Also, the multi-component ionomer of the present invention has excellent adhesion performance to different kinds of highly-polar materials, since the multi-component ionomer has the substantially straight chain structure, and it contains the structural unit (C) derived from the specific acyclic monomer besides the structural unit (A) and the structural unit (B') (in which at least a part of the structural unit (B) is converted into the metal-containing carboxylate).

(1) Structural Unit (A)

The structural unit (A) is a structural unit derived from at least one selected from the group consisting of ethylene and an α-olefin containing 3 to 20 carbon atoms.

The α-olefin of the present invention is an α-olefin which contains 3 to 20 carbon atoms and which is represented by the following structural formula: $CH_2=CHR^1$ (where $R^1$ is a hydrocarbon group containing 1 to 18 carbon atoms and optionally having a straight or branched chain structure). The α-olefin more preferably contains 3 to 12 carbon atoms.

As the structural unit (A), concrete examples include, but are not limited to, structural units derived from ethylene, propylene, 1-butene, 1-pentene, 1-hexene, 1-octene, 1-decene, 3-methyl-1-butene and 4-methyl-1-pentene. The structural unit (A) may be a structural unit derived from ethylene.

As the structural unit (A), such structural units may be used solely or in combination of two or more kinds.

As the combination of two kinds of such structural units, examples include, but are not limited to, structural units derived from ethylene-propylene, ethylene-1-butene, ethylene-1-hexene, ethylene-1-octene, propylene-1-butene, propylene-1-hexene and propylene-1-octene.

As the combination of three kinds of such structural units, examples include, but are not limited to, structural units derived from ethylene-propylene-1-butene, ethylene-propylene-1-hexene, ethylene-propylene-1-octene, propylene-1-butene-hexene and propylene-1-butene-1-octene.

In the present invention, the structural unit (A) preferably contains a structural unit derived from ethylene as an essential component. As needed, the structural unit (A) may further contain one or more kinds of structural units derived from α-olefins each of which contains 3 to 20 carbon atoms.

The structural unit derived from ethylene in the structural unit (A) may be from 65 mol % to 100 mol %, or may be from 70 mol % to 100 mol %, for the total mol of the structural unit (A).

From the viewpoint of impact resistance, the structural unit (A) may be a structural unit derived from ethylene.

(2) Structural Unit (B)

The structural unit (B) is a structural unit derived from a monomer containing at least one selected from the group consisting of a carboxy group and a dicarboxylic anhydride group. The structural unit (B) means that it is the same structure as the structural unit derived from the monomer containing at least one selected from the group consisting of a carboxy group and a dicarboxylic anhydride group. As will be described in the production method described later, the structural unit (B) may be a structural unit produced without the use of the monomer containing at least one selected from the group consisting of a carboxy group and a dicarboxylic anhydride group.

As the monomer containing a carboxy group, examples include, but are not limited to, unsaturated carboxylic acid such as acrylic acid, methacrylic acid, maleic acid, fumaric acid, tetrahydrophthalic acid, itaconic acid, citraconic acid, crotonic acid, isocrotonic acid, norbornene dicarboxylic acid and bicyclo[2,2,1]hept-2-ene-5,6-dicarboxylic acid. As the monomer containing a dicarboxylic anhydride group, examples include, but are not limited to, unsaturated dicarboxylic anhydride such as maleic anhydride, itaconic anhydride, citraconic anhydride, tetrahydrophthalic anhydride, 5-norbornene-2,3-dicarboxylic anhydride, 3,6-epoxy-1,2,3, 6-tetrahydrophthalic anhydride, tetracyclo[$6.2.1.1^{3,6}.0^{2,7}$] dodec-9-ene-4,5-dicarboxylic anhydride, and 2,7-octadiene-1-yl succinic anhydride.

From the viewpoint of availability on an industrial scale, the structural unit derived from the monomer containing at least one selected from the group consisting of a carboxy group and a dicarboxylic anhydride group, is preferably a structural unit derived from acrylic acid, methacrylic acid or 5-norbornene-2,3-dicarboxylic anhydride. Of them, the structural unit may be a structural unit derived from acrylic acid.

The structural unit derived from the monomer containing at least one selected from the group consisting of a carboxy group and a dicarboxylic anhydride group, may be one or more kinds of structural units.

In some cases, the dicarboxylic anhydride group reacts with moisture in the air to develop a ring-opening reaction, and a part thereof may change into dicarboxylic acid. The dicarboxylic anhydride group may be ring-opened as long as it does not depart from the gist of the present invention.

(3) Structural Unit (C)

The structural unit (C) is a structural unit derived from the acyclic monomer represented by the following general formula (1) (in the present Description, hereinafter, the acyclic monomer represented by the following general formula (1) may be simply referred to as "acyclic monomer"):

where $T^1$ to $T^3$ are each independently a hydrogen atom, a hydrocarbon group containing 1 to 20 carbon atoms, a hydrocarbon group containing 1 to 20 carbon atoms and being substituted with a hydroxyl group, a hydrocarbon group containing 2 to 20 carbon atoms and being substituted with an alkoxy group containing 1 to 20 carbon atoms, a hydrocarbon group containing 3 to 20 carbon atoms and being substituted with an ester group containing 2 to 20 carbon atoms, a hydrocarbon group containing 1 to 20 carbon atoms and being substituted with a halogen atom, an alkoxy group containing 1 to 20 carbon atoms, an aryl group containing 6 to 20 carbon atoms, an ester group containing 2 to 20 carbon atoms, a silyl group containing 3 to 20 carbon atoms, a halogen atom or a cyano group, and $T^4$ is a hydrocarbon group containing 1 to 20 carbon atoms and being substituted with a hydroxyl group, a hydrocarbon group containing 2 to 20 carbon atoms and being substituted with an alkoxy group containing 1 to 20 carbon atoms, a hydrocarbon group containing 3 to 20 carbon atoms and being substituted with an ester group containing 2 to 20 carbon atoms, a hydrocarbon group containing 1 to 20 carbon atoms and being substituted with a halogen atom, an alkoxy group containing 1 to 20 carbon atoms, an aryl group containing 6 to 20 carbon atoms, an ester group containing 2 to 20 carbon atoms, a silyl group containing 3 to 20 carbon atoms, a halogen atom, or a cyano group.

For $T^1$ to $T^4$, the carbon skeleton of the hydrocarbon group, alkoxy group, aryl group, ester group and silyl group may contain at least one selected from the group consisting of a branch, a ring and an unsaturated bond. The number of the carbon atoms of the ester group (—COOR) includes the number of the carbon atoms of a carbonyl group. The number of the carbon atoms of the hydrocarbon group which contains a substituent, includes the number of the carbon atoms of the substituent.

For $T^1$ to $T^4$, the number of the carbon atoms of the hydrocarbon group may be as follows: the lower limit is 1 or more, and the upper limit is 20 or less or may be 10 or less.

For $T^1$ to $T^4$, the number of the carbon atoms of the alkoxy group may be as follows: the lower limit is 1 or more, and the upper limit is 20 or less or may be 10 or less.

For $T^1$ to $T^4$, the number of the carbon atoms of the aryl group may be as follows: the lower limit is 6 or more, and the upper limit 20 or less or may be 11 or less.

For $T^1$ to $T^4$, the number of the carbon atoms of the ester group may be as follows: the lower limit is 2 or more, and the upper limit is 20 or less or may be 10 or less.

For $T^1$ to $T^4$, the number of the carbon atoms of the silyl group may be as follows: the lower limit is 3 or more, and the upper limit is 18 or less or may be 12 or less. As the silyl group, examples include, but are not limited to, a trimethylsilyl group, a triethylsilyl group, a tri-n-propylsilyl group, a triisopropylsilyl group, a dimethylphenylsilyl group, a methyldiphenylsilyl group and a triphenylsilyl group.

In the multi-component ionomer of the present invention, from the viewpoint of ease of production, $T^1$ and $T^2$ may be a hydrogen atom; $T^3$ may be a hydrogen atom or a methyl group; and $T^1$ to $T^3$ may be all hydrogen atoms.

From the viewpoint of impact resistance and adhesion, $T^4$ may be an ester group containing 2 to 20 carbon atoms.

As the acyclic monomer, examples include, but are not limited to, the case where $T^4$ is an ester group containing 2 to 20 carbon atoms, such as (meth)acrylic acid ester.

When $T^4$ is an ester group containing 2 to 20 carbon atoms, as the acyclic monomer, examples include a compound represented by the following structural formula: $CH_2=C(R^{21})CO_2(R^{22})$ where $R^{21}$ is a hydrogen atom or a hydrocarbon group containing 1 to 10 carbon atoms and optionally containing at least one selected from the group consisting of a branch, a ring and an unsaturated bond; $R^{22}$ is a hydrocarbon group containing 1 to 19 carbon atoms and optionally containing at least one selected from the group consisting of a branch, a ring and an unsaturated bond; and a heteroatom is optionally contained in any position of $R^{22}$.

As the compound represented by the structural formula $CH_2=C(R^{21})CO_2(R^{22})$, examples include the compound where $R^{21}$ is a hydrogen atom or a hydrocarbon group containing 1 to 5 carbon atoms, an acrylic acid ester where $R^{21}$ is a hydrogen atom, and a methacrylic acid ester where $R^{21}$ is a methyl group.

As the compound represented by the structural formula $CH_2=C(R^{21})CO_2(R^{22})$, concrete examples include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, octadecyl (meth)acrylate, phenyl (meth)acrylate, toluyl (meth)acrylate and benzyl (meth)acrylate.

From the viewpoint of flexibility and impact resistance, the acyclic monomer is preferably an acrylic acid ester and an acrylic acid ester where $R^{22}$ contains 1 to 8 carbon atoms, such as at least one compound selected from the group consisting of methyl acrylate, ethyl acrylate, n-butyl acrylate (nBA), isobutyl acrylate (iBA), t-butyl acrylate (tBA) and 2-ethylhexyl acrylate. Of them, the acrylic acid ester may be at least one selected from the group consisting of n-butyl acrylate (nBA) and isobutyl acrylate (iBA).

As the acyclic monomer, examples include, but are not limited to, 5-hexene-1-ol, allyl methyl ether, ethyl-4-pentenoate, 4-chloro-1-butene, methyl vinyl ether, styrene, vinyltrimethylsilane, vinyl chloride and (meth)acrylonitrile.

The structural unit derived from the acyclic monomer may be one or more kinds of structural units.

(4) Multi-Component Copolymer (D)

The multi-component copolymer (D) of the present invention comprises, as essential constitutional units, the structural unit (A) derived from at least one selected from the group consisting of ethylene and an α-olefin containing 3 to 20 carbon atoms, the structural unit (B) derived from the monomer containing at least one selected from the group consisting of a carboxy group and a dicarboxylic anhydride group, and the structural unit (C) derived from the acyclic monomer represented by the general formula (1). They are substantially linearly copolymerized.

The multi-component copolymer (D) of the present invention corresponds to the base resin which is not yet converted from at least a part of at least one selected from the group consisting of a carboxy group and a dicarboxylic anhydride group of the structural unit (B) to the metal-containing carboxylate.

The multi-component copolymer of the present invention needs to contain one or more kinds of the structural units (A), one or more kinds of the structural units (B), and one or more kinds of the structural units (C). That is, the multi-component copolymer of the present invention needs to contain a total of three or more kinds of monomer units.

Hereinafter, the structural units of the multi-component copolymer of the present invention and the amounts of the structural units (the structural unit amounts) will be described.

The structure derived from one molecule of at least one monomer (A) selected from the group consisting of ethylene and an α-olefin containing 3 to 20 carbon atoms, the structure derived from one molecule of the monomer (B) containing at least one selected from the group consisting of a carboxy group and a dicarboxylic anhydride group, and the structure derived from one molecule of the acyclic monomer (C) are each defined as one structural unit of the multi-component copolymer.

The percentage by mol (mol %) of each structural unit when the whole structural units of the multi-component copolymer are defined as 100 mol %, is the structural unit amount. Structural unit amount of the structural unit (A) derived from at least one selected from the group consisting of ethylene and an α-olefin containing 3 to 20 carbon atoms For the structural unit amount of the structural unit (A) of the present invention, from the viewpoint of enhancing the toughness of the multi-component copolymer and the multi-component ionomer, the lower limit is selected from preferably 60.0 mol % or more, more preferably 70.0 mol % or more, even more preferably 80.0 mol % or more, still more preferably 85.0 mol % or more, particularly preferably 90.0 mol % or more, and most preferably 91.2 mol % or more. On the other hand, for the structural unit amount of the structural unit (A) of the present invention, from the viewpoint of suppressing an excessive increase in the crystallinity of the multi-component copolymer and the multi-component ionomer and enhancing the transparency, the upper limit is selected from preferably 97.9 mol % or less, more preferably 97.5 mol % or less, even more preferably 97.0 mol % or less, still more preferably 96.7 mol % or less, particularly preferably 96.3 mol % or less, and most preferably 94.0 mol % or less.

Structural Unit Amount of the Structural Unit (B) Derived from the Monomer Containing at Least One Selected from the Group Consisting of a Carboxy Group and a Dicarboxylic Anhydride Group For the structural unit amount of the structural unit (B) of the present invention, from the point of view that the multi-component copolymer and the multi-component ionomer obtain sufficient adhesion to different kinds of highly-polar materials, the lower limit is selected from preferably 2.0 mol % or more, more preferably 3.0 mol % or more, even more preferably 3.2 mol % or more, still more preferably 4.2 mol % or more, and particularly preferably 5.2 mol % or more. On the other hand, for the structural unit amount of the structural unit (B) of the present invention, from the viewpoint of enhancing the mechanical properties of the multi-component copolymer and the multi-component ionomer, the upper limit is selected from preferably 20.0 mol % or less, more preferably 15.0 mol % or less, even more preferably 10.0 mol % or less, still more preferably 8.0 mol % or less, particularly preferably 6.0 mol % or less, and most preferably 5.5 mol % or less.

Also, the monomer containing at least one selected from the group consisting of a carboxy group and a dicarboxylic anhydride group, may be used solely or in combination of two or more kinds.

Structural Unit Amount of the Structural Unit (C) Derived from the Acyclic Monomer For the structural unit amount of the structural unit (C) of the present invention, from the point of view that the multi-component copolymer and the multi-component ionomer obtain sufficient adhesion to different kinds of highly-polar materials, the lower limit is selected from preferably 0.1 mol % or more, more preferably 0.3 mol % or more, even more preferably 0.5 mol % or more, still more preferably 0.6 mol % or more, particularly preferably 1.0 mol % or more, and most preferably 1.9 mol % or more. From the viewpoint of transparency, the lower limit is selected from preferably 0.5 mol % or more, more preferably 1.0 mol % or more, and even more preferably 1.9 mol % or more. On the other hand, from the viewpoint of enhancing the mechanical properties of the multi-component copolymer and the multi-component ionomer, the upper limit is selected from preferably 20.0 mol % or less, more preferably 15.0 mol % or less, even more preferably 10.0 mol % or less, still more preferably 5.0 mol % or less, and particularly preferably 3.8 mol % or less.

The acyclic monomer may be one kind of acyclic monomer, or it may be used solely or in combination of two or more kinds.

Number of Branches Per 1,000 Carbon Atoms of the Multi-Component Copolymer

In the multi-component copolymer of the present invention, the number of methyl branches is calculated by $^{13}$C-NMR. From the viewpoint of increasing the elastic modulus and obtaining sufficient mechanical properties, the upper limit of the number of the methyl branches per 1,000 carbon atoms may be 50 or less, 5.0 or less, 1.0 or less, or 0.5 or less. The lower limit is not particularly limited and may be as small as possible. The upper limit of the number of ethyl branches per 1,000 carbon atoms may be 3.0 or less, 2.0 or less, 1.0 or less, or 0.5 or less. The lower limit is not particularly limited and may be as small as possible. The upper limit of the number of butyl branches per 1,000 carbon atoms may be 7.0 or less, 5.0 or less, 3.0 or less, or 0.5 or less. The lower limit is not particularly limited and may be as small as possible.

Method for Measuring the Amounts of the Structural Units Derived from the Monomer Containing at Least One Selected from the Group Consisting of a Carboxy Group and a Dicarboxylic Anhydride Group and the Acyclic Monomer in the Multi-Component Copolymer, and the Number of the Branches The amounts of the structural units derived from the monomer containing at least one selected from the group consisting of a carboxy group and a dicarboxylic anhydride group and the acyclic monomer in the multi-component copolymer of the present invention, and the number of the branches per 1,000 carbon atoms, are obtained by use of a $^{13}$C-NMR spectrum. $^{13}$C-NMR is measured by the following method.

First, 200 mg to 300 mg of a sample, 2.4 ml of a mixed solvent of o-dichlorobenzene ($C_6H_4Cl_2$) and deuterated benzene bromide ($C_6D_5Br$) ($C_6H_4Cl_2/C_6D_5Br=2/1$ (volume ratio)) and hexamethyldisiloxane used as a chemical shift standard, are put in an NMR sample tube having an inner diameter of 10 mm. After nitrogen substitution, the tube is sealed. The materials are dissolved by heating to obtain a homogenous solution, which is used as an NMR measurement sample.

NMR measurement is carried out at 120° C. by use of an NMR instrument (AV400M manufactured by Bruker Japan K. K.) furnished with a 10 mm-diameter cryoprobe.

The $^{13}$C-NMR measurement conditions are as follows.
Sample temperature: 120° C.
Pulse angle: 90°
Pulse interval: 51.5 sec
Accumulated number of times: 512 or more
Measurement method: Inverse gated decoupling The $^{13}$C signal of hexamethyldisiloxane is set to 1.98 ppm, and the chemical shifts of other $^{13}$C signals are based on this.

From the thus-obtained $^{13}$C-NMR, signals specific to the monomers or branches in the multi-component copolymer are identified, and the strengths are compared, thereby analyzing the structural unit amount of the monomers in the multi-component copolymer and the number of the branches thereof. Known literatures can be referred to for the position of the signals specific to the monomers or branches, or the position can be independently identified depending on the sample. Such an analyzing method is a method that can be generally carried out by those skilled in the art.

Weight Average Molecular Weight (Mw) and Molecular Weight Distribution (Mw/Mn)

For the weight average molecular weight (Mw) of the multi-component copolymer of the present invention, from the viewpoint of enhancing the physical properties such as mechanical strength and impact resistance, the lower limit is generally 1,000 or more, preferably 6,000 or more, and more preferably 10,000 or more. From the viewpoint of suppressing an excessive increase in the melt viscosity of the multi-component copolymer and making mold processing easy, the upper limit is generally 2,000,000 or less, preferably 1,500,000 or less, more preferably 1,000,000 or less, even more preferably 800,000 or less, and most preferably 100,000 or less.

For the ratio (Mw/Mn) of the weight average molecular weight (Mw) to the number average molecular weight (Mn) of the multi-component copolymer of the present invention, from the viewpoint of obtaining sufficient processing properties such as molding of the multi-component copolymer and the multi-component ionomer, the lower limit is generally 1.5 or more, preferably 1.6 or more, and more preferably 1.9 or more. From the viewpoint of the mechanical properties of the multi-component copolymer and the multi-component ionomer, the upper limit is generally 4.0 or less, preferably 3.5 or less, and more preferably 2.3 or less.

In the present invention, the ratio Mw/Mn may be referred to as "molecular weight distribution parameter".

In the present invention, the weight average molecular weight (Mw) and the number average molecular weight (Mn) are obtained by gel permeation chromatography (GPC). The molecular weight distribution parameter (Mw/Mn) calculates the ratio of Mw to Mn (Mw/Mn).

An example of the GPC measurement method of the present invention is as follows.

(Measurement Conditions)
  Device: 150C manufactured by Waters Corporation
  Detector: "MIRAN1A-IR" manufactured by FOXBORO (measurement wavelength: 3.42 μm)
  Measurement temperature: 140° C.
  Solvent: Ortho-dichlorobenzene (ODCB)
  Columns: AD806M/S manufactured by Showa Denko K. K. (Number of the columns: 3)
  Flow rate: 1.0 mL/min
  Injected amount: 0.2 mL (Preparation of Sample)
  As a sample, ODCB (containing 0.5 mg/mL BHT (2,6-di-t-butyl-4-methylphenol)) is used to prepare a 1 mg/mL solution and dissolved at 140° C. for about one hour.

(Calculation of Molecular Weight (M))
  The molecular weight is calculated by the standard polystyrene method. The conversion from retention volume to molecular weight is carried out by use of calibration curves prepared by standard polystyrenes in advance. The standard polystyrenes used are the following products manufactured by Tosoh Corporation: F380, F288, F128, F80, F40, F20, F10, F4, F1, A5000, A2500 and A1000. A solution is prepared by dissolving each standard polystyrene in ODCB (containing 0.5 mg/mL BHT) to be 0.5 mg/mL. Next, 0.2 mL of the solution is injected to generate a calibration curve. The calibration curve makes use of a cubic formula obtained by approximation by the least-squares method. A viscosity formula ($[\eta]=K \times M\alpha$) is used for conversion to molecular weight (M) and makes use of the following numerical values.
  Polystyrene (PS): $K=1.38 \times 10^{-4}$, $\alpha=0.7$
  Polyethylene (PE): $K=3.92 \times 10^{-4}$, $\alpha=0.733$
  Polypropylene (PP): $K=1.03 \times 10^{-4}$, $\alpha=0.78$ Melting point (Tm) (° C.)

The melting point of the multi-component copolymer of the present invention is indicated by the maximum peak temperature of an endothermic curve measured by a differential scanning calorimeter (DSC). In the DSC measurement, if several peaks are found in the endothermic curve, which is obtained in a graph with heat flow (mW) on the vertical axis and temperature (° C.) on the horizontal axis, the temperature of a peak having the maximum height from the baseline is the maximum peak temperature. If there is only one peak, the temperature of the peak is the maximum peak temperature.

For the melting point of the multi-component copolymer of the present invention, from the viewpoint of heat resistance, the lower limit is preferably 50° C. or more, more preferably 60° C. or more, and even more preferably 70° C. or more. From the viewpoint of obtaining sufficient adhesion to different kinds of highly-polar materials, the upper limit is preferably 140° C. or less, more preferably 110° C. or less, even more preferably 100° C. or less, still more preferably 98° C. or less, and particularly preferably 96° C. or less.

In the present invention, the melting point can be obtained as follows, for example. DSC (product name: DSC 7020, manufactured by SII NanoTechnology Inc.) is used. The sample (about 5.0 mg) is packed in an aluminum pan. The temperature of the sample is increased to 200° C. at a rate of 10° C./min, isothermally kept at 200° C. for 5 minutes, decreased to 20° C. at a rate of 10° C./min, isothermally kept at 20° C. for 5 minutes, and then increased again to 200° C. at a rate of 10° C./min to obtain an absorption curve. Finally, the melting point is obtained from the absorption curve.

Crystallinity (%)

In the multi-component copolymer of the present invention, the crystallinity observed by differential scanning calorimetry (DSC) is not particularly limited. For the crystallinity, from the viewpoint of enhancing the toughness of the multi-component copolymer and the multi-component ionomer, the lower limit is preferably more than 0%, more preferably more than 5%, and even more preferably 7% or more. From the viewpoint of the transparency of the multi-component copolymer and the multi-component ionomer, the upper limit is preferably 30% or less, more preferably 25% or less, and even more preferably 24% or less.

The crystallinity serves as the index of transparency. As the crystallinity of the multi-component copolymer decreases, the transparency thereof can be determined to be better.

In the present invention, the crystallinity can be obtained as follows, for example. DSC (product name: DSC 7020, manufactured by SII NanoTechnology Inc.) is used. The sample (about 5.0 mg) is packed in an aluminum pan. The temperature of the sample is increased to 200° C. at a rate of 10° C./min, isothermally kept at 200° C. for 5 minutes, decreased to 20° C. at a rate of 10° C./min, isothermally kept at 20° C. for 5 minutes, and then increased again to 200° C. at a rate of 10° C./min to obtain a melting endothermic peak area. A melting heat (ΔH) is obtained from the melting endothermic peak area, and the melting heat is divided by the melting heat (293 J/g) of a perfect crystal of high-density polyethylene (HDPE), thereby obtaining the crystallinity.

Molecular Structure of the Multi-Component Copolymer

The molecular chain terminals of the multi-component copolymer of the present invention may be the structural unit (A), (B) or (C).

As the multi-component copolymer of the present invention, examples include, but are not limited to, random, block and graft copolymers of the structural units (A), (B) and (C). Of them, the multi-component copolymer may be the random copolymer that can contain a large number of the structural units (B).

The molecular structure example (1) of a common ternary copolymer is shown below.

The random copolymer is the following copolymer: like the molecular structure example (1) shown below, the probability that the structural unit (A), the structural unit (B) and the structural unit (C) find each other at any position in any molecular chain, is irrelevant to the type of adjacent structural units.

-ABCAAABBCBAABACCAA-    Molecular Structure Example (1)

As an example of the graft copolymer, the molecular structure example (2) of a multi-component copolymer will be shown below as a reference, in which the structural unit (B) is introduced by graft modification. In the molecular structure example (2), a part of the copolymer of the structural unit (A) and the structural unit (C) is graft-modified by the structural unit (B).

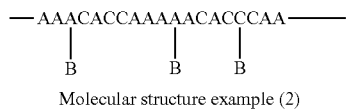

Molecular structure example (2)

The random copolymerizability of the copolymer can be confirmed by various kinds of methods. A method for determining the random copolymerizability from the relationship between the comonomer content and melting point of a multi-component copolymer, is described in detail in JP-A Nos. 2015-163691 and 2016-079408. From the literatures, when the melting point (Tm) (° C.) of the multi-component copolymer is more than −3.74×[Z]+130 (where [Z] is the comonomer content/mol %), the random copolymerizability can be determined to be low.

In the multi-component copolymer of the present invention which is a random copolymer, the melting point (Tm) (° C.) observed by differential scanning calorimetry (DSC) and the total content [Z] (mol %) of the structural unit (B) derived from the monomer containing at least one selected from the group consisting of a carboxy group and a dicarboxylic anhydride group and the structural unit (C) derived from the acyclic monomer preferably satisfy the following formula (I):

$$50 < Tm < -3.74 \times [Z] + 130. \quad \text{Formula (I)}$$

When the melting point (Tm) (° C.) of the multi-component copolymer is more than −3.74×[Z]+130 (° C.), since the random copolymerizability is low, the mechanical properties such as impact strength may be poor. When the melting point is less than 50° C., the heat resistance may be poor.

The multi-component copolymer of the present invention may be produced in the presence of the transition metal catalyst, from the viewpoint of rendering the molecular structure a straight chain molecular structure.

The molecular structure of the multi-component copolymer is known to vary by the production method, such as polymerization by a high-pressure radical polymerization process, polymerization by use of a metal catalyst, etc.

The difference in the molecular structure can be controlled by the selected production method. For example, as described in JP-A No. 2010-150532, the molecular structure can be estimated by the complex modulus measured with a rotational rheometer.

Phase angle δ at which the absolute value G* of the complex modulus is 0.1 MPa (G*=0.1 MPa)

For the phase angle δ at which the absolute value G* of the complex modulus measured with the rotational rheometer is 0.1 MPa (G*=0.1 MPa) of the multi-component copolymer of the present invention, the lower limit may be 50 degrees or more, 51 degrees or more, 54 degrees or more, 56 degrees or more, or 58 degrees or more. The upper limit may be 75 degrees or less or 70 degrees or less.

More specifically, when the phase angle δ at which the absolute value G* of the complex modulus measured with the rotational rheometer is 0.1 MPa (G*=0.1 MPa) is 50 degrees or more, the molecular structure of the multi-component copolymer is a straight chain structure which does not contain a long chain branch or which contains small amounts of long chain branches to the extent that does not make an influence on the mechanical strength.

When the phase angle δ at which the absolute value G* of the complex modulus measured with the rotational rheometer is 0.1 MPa (G*=0.1 MPa) is less than 50 degrees, the molecular structure of the multi-component copolymer is a structure which contains excessive amounts of long chain branches, and the mechanical strength is poor.

The phase angle δ at which the absolute value G* of the complex modulus measured with the rotational rheometer is 0.1 MPa (G*=0.1 MPa) is influenced by both the molecular weight distribution and the long chain branches. However, only in the case of the multi-component copolymer for which the ratio Mw/Mn is 4 or less, and more preferably 3 or less, the phase angle δ serves as the index of the amount of the long chain branches, and as the amount of the long chain branches contained in the molecular structure increases, the δ value (G*=0.1 MPa) decreases. When the ratio Mw/Mn of the multi-component copolymer is 1.5 or more, the δ value (G*=0.1 MPa) does not exceed 75 degrees even in the case where the molecular structure does not contain a long chain branch.

In the present invention, the method for measuring the complex modulus is as follows.

A sample is put in a mold for heating press having a thickness of 1 mm and pre-heated for 5 minutes in a heat pressing device with a surface temperature of 180° C. Then, pressurization and depressurization are repeatedly carried out on the sample to deaerate residual gas in the sample. In addition, pressurization at 4.9 MPa is carried out on the sample and kept for 5 minutes. Then, the sample is transferred to a pressing device with a surface temperature of 25° C. and kept at a pressure of 4.9 MPa for 3 minutes to cool down, thereby producing a pressed plate composed of the sample having a thickness of about 1.0 mm. The pressed plate composed of the sample is formed into a circle having a diameter of 25 mm and used as a measurement sample. Using an ARES-type rotational rheometer (manufactured by Rheometrics) as a dynamic viscoelasticity measuring device, the dynamic viscoelasticity of the sample is measured under a nitrogen atmosphere in the following conditions.

Plate: Parallel plate (diameter 25 mm)
Temperature: 160° C.
Distortion amount: 10%
Measurement angular frequency range: $1.0 \times 10^{-2}$ rad/s to $1.0 \times 10^{2}$ rad/s
Measurement interval: 5 points/decade The phase angle δ is plotted with respect to the common logarithm log G* of the absolute value G* (Pa) of the complex modulus. The value of δ (degree) of a point corresponding to log G*=5.0 is set as δ (G*=0.1 MPa). In a case where there is no point corresponding to log G*=5.0 in the measurement points, using two points around log G*=5.0, the δ value at log G*=5.0 is obtained by linear interpolation. When all the measured points correspond to log G*<5, using the values of three points with larger log G* values, the δ value at log G*=5.0 in a quadratic curve, is obtained by extrapolation.

In the multi-component copolymer of the present invention, from the viewpoint of enhancing the flexibility of the multi-component ionomer of the present invention, the tensile modulus obtained by the tensile test described in JIS K 7151:1995, is preferably 200 MPa or less, more preferably 180 MPa or less, and even more preferably 100 MPa or less.

In the multi-component copolymer of the present invention, from the viewpoint of enhancing the strength of the multi-component ionomer of the present invention, the tensile stress at break obtained by the tensile test described in JIS K 7151:1995, is preferably 18 MPa or more, more preferably 22 MPa or more, and even more preferably 25 MPa or more.

In the multi-component copolymer of the present invention, from the viewpoint of enhancing the strength and toughness of the multi-component ionomer of the present invention, the tensile impact strength obtained by the tensile test described in JIS K 7151:1995, is preferably 200 kJ/m$^2$ or more, and more preferably 400 kJ/m or more.

The tensile test can be measured by the method described below in "Examples".

(5) Multi-Component Ionomer

In the multi-component ionomer of the present invention, at least a part of at least one selected from the group consisting of a carboxy group and a dicarboxylic anhydride group of the structural unit (B) of the multi-component copolymer (D), is converted into the metal-containing carboxylate containing at least one metal ion selected from the group consisting of Groups 1, 2 and 12 of the periodic table; the phase angle δ at which the absolute value G* of the complex modulus measured with a rotational rheometer is 0.1 MPa (G*=0.1 MPa) is from 50 degrees to 75 degrees; and the multi-component ionomer of the present invention substantially has the straight chain structure.

Metal-Containing Carboxylate Contained in the Multi-Component Ionomer

As the metal ion contained in the metal-containing carboxylate, examples include, but are not limited to, at least one monovalent or divalent metal ion selected from the group consisting of Groups 1, 2 and 12 of the periodic table, such as at least one selected from the group consisting of Li$^+$, Na$^+$, K$^+$, Rb$^+$, Cs$^+$, Mg$^{2+}$, Ca$^{2+}$, Sr$^{2+}$, Ba$^{2+}$ and Zn$^{2+}$. The metal ion may be at least one selected from the group consisting of Li$^+$, Na$^+$, K$^+$, Rb$^+$, Mg$^{2+}$, Ca$^{2+}$ and Zn$^{2+}$. From the viewpoint of easy handling, it may be a sodium or zinc ion.

The metal ion may be one or more kinds of metal ions.

Neutralization Degree (Mol %)

The content of the metal ion is preferably such an amount that causes at least part or all of at least one selected from the group consisting of a carboxy group and a dicarboxylic anhydride group in the multi-component copolymer (the base resin) to be neutralized. The neutralization degree (average neutralization degree) is preferably from 5 mol % to 95 mol %, more preferably from 10 mol % to 90 mol %, and even more preferably from 20 mol % to 80 mol %, with respect to the total mol amount of the carboxy group in the multi-component copolymer.

The neutralization degree can be obtained from the ratio of the total mol amount (the valence×the mol amount) of the metal ion with respect to the total mol amount of the carboxy group that can be contained in at least one selected from the group consisting of a carboxy group and a dicarboxylic anhydride group in the multi-component copolymer.

In the formation of the carboxylate, the dicarboxylic anhydride group develops a ring-opening reaction and changes into dicarboxylic acid. Accordingly, the total mol amount of the carboxy group is obtained on the basis that the carboxy group is 2 mol per mol of the dicarboxylic anhydride group. Also, on the basis that the divalent metal ion such as Zn$^{2+}$ can form a salt with 2 mol of the carboxy group per mol, the total mol amount of the molecules of the neutralization degree is calculated by 2× the mol amount.

When the neutralization degree is high, the tensile strength and tensile stress at break of the ionomer tend to be high, and the tensile strain at break tends to be low. However, the melt flow rate (MFR) of the ionomer tends to be high. On the other hand, when the neutralization degree is low, the ionomer tends to obtain an appropriate MFR; however, the tensile modulus and tensile stress at break of the ionomer tends to be low, and the tensile strain at break tends to be high.

Structure of the Multi-Component Ionomer

In the multi-component ionomer of the present invention, the phase angle δ at which the absolute value G* of the complex modulus measured with a rotational rheometer is 0.1 MPa (G*=0.1 MPa) is from 50 degrees to 75 degrees.

When the phase angle δ (G*=0.1 MPa) is less than 50 degrees, the molecular structure of the multi-component ionomer is a structure which contains excessive amounts of long chain branches, and the mechanical strength is poor. The δ value (G*=0.1 MPa) does not exceed 75 degrees even in the case where the molecular structure does not contain a long chain branch.

In the multi-component ionomer of the present invention, from the viewpoint of increasing the mechanical strength, the lower limit of the phase angle δ is preferably 51 degrees or more, more preferably 54 degrees or more, even more preferably 56 degrees or more, and still more preferably 58 degrees or more. The upper limit is not particularly limited and may be as close as possible to 75 degrees.

Melting Point (Tm) (° C.) of the Multi-Component Ionomer

In the multi-component ionomer of the present invention, from the viewpoint of obtaining heat resistance and sufficient adhesion to different kinds of highly-polar materials, the melting point (Tm) (° C.) observed by differential scanning calorimetry (DSC) is preferably from 50° C. to 140° C.

For the melting point (Tm) (° C.), from the viewpoint of heat resistance, the lower limit is preferably 60° C. or more, more preferably 70° C. or more, and even more preferably 80° C. or more. From the viewpoint of obtaining sufficient adhesion to different kinds of highly-polar materials, the upper limit is preferably 120° C. or less, more preferably 110° C. or less, even more preferably 100° C. or less, still more preferably 99° C. or less, and particularly preferably 96° C. or less.

Crystallinity (%) of the Multi-Component Ionomer

In the multi-component ionomer of the present invention, the crystallinity is observed by differential scanning calorimetry (DSC). For the crystallinity, from the viewpoint of enhancing the toughness of the multi-component ionomer, the lower limit is preferably more than 0%, more preferably more than 5%, and even more preferably 7% or more. From the viewpoint of the transparency of the multi-component ionomer, the upper limit is preferably 30% or less, more preferably 27% or less, even more preferably 24% or less, and still more preferably 22% or less. The crystallinity serves as the index of transparency. As the crystallinity of the multi-component ionomer decreases, the transparency thereof can be determined to be better.

Tensile Modulus of the Multi-Component Ionomer

In the multi-component ionomer of the present invention, from the viewpoint of enhancing the flexibility of the multi-component ionomer, the tensile modulus obtained by the tensile test described in JIS K 7151:1995, is preferably 400 MPa or less, more preferably 300 MPa or less, and even more preferably 230 MPa or less.

Tensile Stress at Break of the Multi-Component Ionomer

In the multi-component ionomer of the present invention, from the viewpoint of enhancing the strength of the multi-component ionomer, the tensile stress at break obtained by the tensile test described in JIS K 7151:1995, is preferably 25 MPa or more, and more preferably 30 MPa or more.

The tensile test can be measured by the method described below in "Examples".

From the viewpoint of being well-balanced between flexibility, strength and transparency, the multi-component ionomer of the present invention preferably further has at least one of the following properties: the melting point, the crystallinity, the tensile modulus and the tensile stress at break.

Adhesion Strength of the Multi-Component Ionomer

In the multi-component ionomer of the present invention, from the viewpoint of enhancing the adhesion of the multi-component ionomer to different kinds of highly-polar materials, the aluminum (Al) adhesion strength obtained by the adhesion strength measuring test described below in "Examples" is preferably 1.8 N/10 mm or more, more preferably 1.9 N/10 mm or more, even more preferably 2.0 N/10 mm or more, and particularly preferably 2.5 N/10 mm or more.

(6) Multi-Component Ionomer Production Method

The method for producing the multi-component ionomer of the present invention is not particularly limited, as long as the multi-component ionomer of the present invention can be obtained.

For example, the method for producing the multi-component ionomer of the present invention may be a method including:

the step of preparing the multi-component copolymer (D) comprising, as essential constitutional units, the structural unit (A) derived from at least one selected from the group consisting of ethylene and an α-olefin containing 3 to 20 carbon atoms, the structural unit (B) derived from the monomer containing at least one selected from the group consisting of a carboxy group and a dicarboxylic anhydride group, and the structural unit (C) derived from the acyclic monomer represented by the general formula (1), and the step of converting at least a part of at least one selected from the group consisting of a carboxy group and a dicarboxylic anhydride group of the structural unit (B) of the multi-component copolymer (D) into the metal-containing carboxylate by reaction with a compound containing at least one metal ion selected from the group consisting of Groups 1, 2 and 12 of the periodic table (a converting step).

(6-1) Step of Preparing the Multi-Component Copolymer (D)

The method for introducing at least one selected from the group consisting of a carboxy group and a dicarboxylic anhydride group into the multi-component copolymer of the present invention, is not particularly limited.

At least one selected from the group consisting of a carboxy group and a dicarboxylic anhydride group can be introduced by various kinds of methods, as long as it does not depart from the gist of the present invention.

As the method for introducing at least one selected from the group consisting of a carboxy group and a dicarboxylic anhydride group, examples include, but are not limited to, the following methods: a method of directly copolymerizing a monomer and a monomer containing at least one selected from the group consisting of a carboxy group and a dicarboxylic anhydride group, and a method of copolymerizing a monomer and a different monomer and then introducing at least one selected from the group consisting of a carboxy group and a dicarboxylic anhydride group into the copolymer by modification.

As the method of copolymerizing a monomer and a different monomer and then introducing at least one selected from the group consisting of a carboxy group and a dicarboxylic anhydride group into the copolymer by modification, examples include, but are not limited to, the following methods: a method of introducing a carboxy group, a method of copolymerizing a monomer and a (meth)acrylic acid ester and then hydrolyzing the copolymer to convert into a carboxy group, and a method of copolymerizing a monomer and t-butyl (meth)acrylate and then heat-decomposing the copolymer to convert into a carboxy group.

Accordingly, the multi-component copolymer (D) may be prepared as follows: a multi-component copolymer precursor (Dp) comprising, as essential constitutional units, a structural unit (Bp) derived from a monomer containing a carboxylic acid ester group which will be the structural unit (B) by thermal decomposition or hydrolysis, the structural unit (A) derived from at least one selected from the group consisting of ethylene and an α-olefin containing 3 to 20 carbon atoms, and the structural unit (C) derived from the acyclic monomer represented by the general formula (1), is prepared, and the carboxylic acid ester group of the structural unit (Bp) in the multi-component copolymer precursor (Dp) is converted into a carboxy group by thermal decomposition or hydrolysis, thereby obtaining the multi-component copolymer (D).

The multi-component copolymer (D) may be produced in the presence of the transition metal catalyst, from the viewpoint of rendering the molecular structure a straight chain molecular structure.

A polymerization catalyst is used to produce the multi-component copolymer (D) or the multi-component copolymer precursor (Dp). The type of the polymerization catalyst is not particularly limited, as long as it can copolymerize the structural units (A), (B) and (C), or the structural units (A), (Bp) and (C). As the polymerization catalyst, examples include, but are not limited to, transition metal complexes of Groups 5 to 11 of the periodic table, the complexes having a chelating ligand.

Preferred transition metal examples include a vanadium atom, a niobium atom, a tantalum atom, a chromium atom, a molybdenum atom, a tungsten atom, a manganese atom, an iron atom, a platinum atom, a ruthenium atom, a cobalt atom, a rhodium atom, a nickel atom, a palladium atom and a copper atom. Of them, preferred are transition metals of Groups 8 to 11 of the periodic table; more preferred are transition metals of Group 10 of the periodic table; and particularly preferred are nickel (Ni) and palladium (Pd). These metals may be used solely or in combination of two or more kinds.

The chelating ligand contains at least two atoms selected from the group consisting of P, N, O, S, As and Sb. It includes bidentate and multidentate ligands, and it is electrically neutral or anionic. Examples of the structure of the chelating ligand are illustrated in reviews by Brookhart, et al. (Chem. Rev., 2000, 100, 1169).

As the chelating ligand, a bidentate anionic P,O ligand is preferred. As the bidentate anionic P,O ligand, examples include, but are not limited to, phosphorus sulfonic acid, phosphorus carboxylic acid, phosphorus phenol and phosphorus enolate. As the chelating ligand, examples also include, but are not limited to, a bidentate anionic N,O ligand. As the bidentate anionic N,O ligand, examples include, but are not limited to, salicylaldiminato and pyridinecarboxylic acid. As the chelating ligand, examples also include, but are not limited to, a diimine ligand, a diphenoxide ligand and a diamide ligand.

As the metal complex obtained from the chelating ligand, examples include, but are not limited to, a metal complex represented by the following general formula (101) or (102) with which an arylphosphine, aryl arsine or aryl antimony compound optionally containing a substituent, is coordinated:

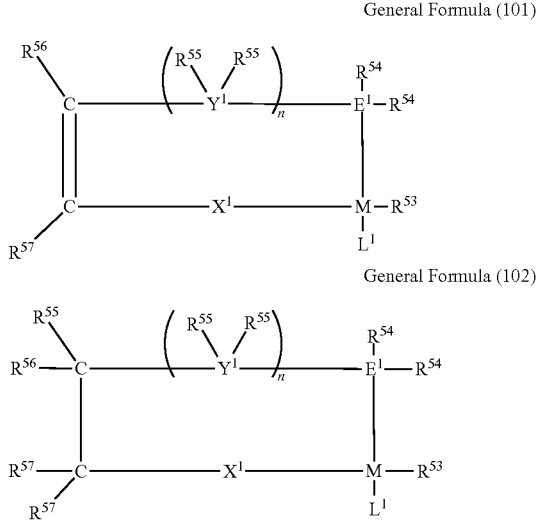

General Formula (101)

General Formula (102)

where M is a transition metal of any of Groups 5 to 11 of the periodic table; $X^1$ is an oxygen atom, a sulfur atom, $-SO_3-$ or $-CO_2-$; $Y^1$ is a carbon atom or a silicon atom; n is an integer of 0 or 1; $E^1$ is a phosphorus atom, an arsenic atom or an antimony atom; $R^{53}$ and $R^{54}$ are each independently a hydrogen atom or a hydrocarbon group containing 1 to 30 carbon atoms and optionally containing a heteroatom; $R^{55}$ is each independently a hydrogen atom, a halogen atom or a hydrocarbon group containing 1 to 30 carbon atoms and optionally containing a heteroatom; $R^{56}$ and $R^{57}$ are each independently a hydrogen atom, a halogen atom, a hydrocarbon group containing 1 to 30 carbon atoms and optionally containing a heteroatom, $OR^{52}$, $CO_2R^{52}$, $CO_2M'$, $C(O)N(R^{51})_2$, $C(O)R^{52}$, $SR^{52}$, $SO_2R^{52}$, $SOR^{52}$, $OSO_2R^{52}$, $P(O)(OR^{52})_{2-y}(R^{51})_y$, $CN$, $NHR^{52}$, $N(R^{52})_2$, $Si(OR^{51})_{3-x}(R^{51})_x$, $OSi(OR^{51})_{3-x}(R^{51})_x$, $NO_2$, $SO_3M'$, $PO_3M'_2$, $P(O)(OR^{52})_2M'$ or an epoxy-containing group; $R^{51}$ is a hydrogen atom or a hydrocarbon group containing 1 to 20 carbon atoms; $R^{52}$ is a hydrocarbon group containing 1 to 20 carbon atoms; M' is an alkali metal, an alkaline-earth metal, an ammonium, a quaternary ammonium or a phosphonium; x is an integer of from 0 to 3; y is an integer of from 0 to 2; $R^{56}$ and $R^{57}$ are optionally bound to form an alicyclic ring, an aromatic ring or a heterocyclic ring containing a heteroatom selected from an oxygen atom, a nitrogen atom and a sulfur atom, the ring being a 5- to 8-membered ring optionally having a substituent thereon; $L^1$ is a ligand coordinated with M; and $R^{53}$ and $L^1$ are optionally bound to form a ring.

More preferably, the metal complex is a transition metal complex represented by the following general formula (103):

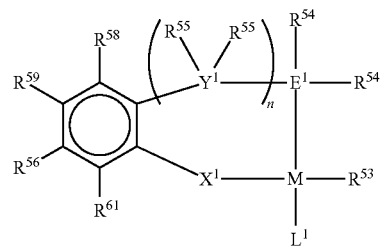

General Formula (103)

where M is a transition metal of any of Groups 5 to 11 of the periodic table; $X^1$ is an oxygen atom, a sulfur atom, $-SO_3-$ or $-CO_2-$; $Y^1$ is a carbon atom or a silicon atom; n is an integer of 0 or 1; $E^1$ is a phosphorus atom, an arsenic atom or an antimony atom; $R^{53}$ and $R^{54}$ are each independently a hydrogen atom or a hydrocarbon group containing 1 to 30 carbon atoms and optionally containing a heteroatom; $R^{55}$ is each independently a hydrogen atom, a halogen atom, or a hydrocarbon group containing 1 to 30 carbon atoms and optionally containing a heteroatom; $R^{58}$, $R^{59}$, $R^{60}$ and $R^{61}$ are each independently a hydrogen atom, a halogen atom, a hydrocarbon group containing 1 to 30 carbon atoms and optionally containing a heteroatom, $OR^{52}$, $CO_2R^{52}$, $CO_2M'$, $C(O)N(R^{51})_2$, $C(O)R^{52}$, $SR^{52}$, $SO_2R^{52}$, $SOR^{52}$, $OSO_2R^{52}$, $P(O)(OR^{52})_{2-y}(R^{51})_y$, $CN$, $NHR^{52}$, $N(R^{52})_2$, $Si(OR^{51})_{3-x}(R^{51})_x$, $OSi(OR^{51})_{3-x}(R^{51})_x$, $NO_2$, $SO_3M'$, $PO_3M'_2$, $P(O)(OR^{52})_2M'$ or an epoxy-containing group; $R^{51}$ is a hydrogen atom or a hydrocarbon group containing 1 to 20 carbon atoms; $R^{52}$ is a hydrocarbon group containing 1 to 20 carbon atoms; M' is an alkali metal, an alkaline-earth metal, an ammonium, a quaternary ammonium or a phosphonium; x is an integer of from 0 to 3; y is an integer of from 0 to 2; groups appropriately selected from $R^{58}$ to $R^{61}$ are optionally bound to form an alicyclic ring, an aromatic ring, or a heterocyclic ring containing a heteroatom selected from an oxygen atom, a nitrogen atom and a sulfur atom, the ring being a 5- to 8-membered ring optionally having a substituent thereon; $L^1$ is a ligand coordinated with M; and $R^{53}$ and $L^1$ are optionally bound to form a ring.

In the general formulae (101) to (103), the transition metal as described above may be used as M; $X^1$ is preferably an oxygen atom or $-SO_3-$; $Y^1$ is preferably a carbon atom; n is preferably 0; $E^1$ is preferably a phosphorus atom; and $L^1$ is a ligand coordinated with M.

In the disclosed embodiments, as the ligand $L^1$, examples include, but are not limited to, a hydrocarbon compound containing 1 to 20 carbon atoms and containing an oxygen atom, a nitrogen atom or a sulfur atom as coordinatable atoms. Also, a hydrocarbon compound containing a carbon-carbon unsaturated bond coordinatable with the transition metal (and optionally containing a heteroatom) may be used as $L^1$. The number of the carbon atoms of $L^1$ is preferably from 1 to 16, and more preferably from 1 to 10. As $L^1$ coordinated with M, a charge-free compound is preferred.

Preferred $L^1$ may be the same as preferred $L^1$ in the general formula (D) in WO2010/050256.

Preferred $R^{53}$ may be the same as preferred $R^3$ in the general formula (D) in WO2010/050256.

Preferred $R^{54}$ may be the same as preferred $R^4$ in the general formula (D) in WO2010/050256.

$R^{53}$ and $L^1$ are optionally bound to form a ring. As the ring, examples include, but are not limited to, a cycloocta-1-enyl group.

As the catalyst of the transition metal complexes of Groups 5 to 11 of the periodic table, the complexes having a chelating ligand, catalysts such as a so-called SHOP-based catalyst and a so-called Drent-based catalyst are typically known.

As the SHOP-based catalyst, examples include, but are not limited to, a catalyst in which a phosphorus-based ligand containing an aryl group optionally containing a substituent, is coordinated with a nickel metal. The catalyst may be used with reference to WO2010/050256, for example.

As the Drent-based catalyst, examples include, but are not limited to, a catalyst in which a phosphorus-based ligand containing an aryl group optionally containing a substituent, is coordinated with a palladium metal. The catalyst may be used with reference to JP-A No. 2010-202647, for example.

The multi-component copolymer (D) is preferably produced by use of the transition metal catalyst containing a transition metal of Groups 8 to 11 of the periodic table, from the point of view that the multi-component ionomer having the above-described properties) can be easily produced.

The transition metal catalyst is preferably the transition metal catalyst containing phosphorus sulfonic acid or phosphorus phenol ligand and nickel or palladium, from the point of view that the multi-component ionomer having the above-described properties can be easily produced. The transition metal catalyst containing phosphorus sulfonic acid or phosphorus phenol ligand and nickel or palladium can be used with reference to JP-A No. 2016-79408, for example.

In the production of the multi-component copolymer of the present invention, polymerization activity is increased by bringing the monomer into contact with a small amount of organometallic compound and then copolymerizing the structural units (A), (B) and (C) or the structural units (A), (Bp) and (C) in the presence of the transition metal catalyst.

The organometallic compound is an organometallic compound containing a hydrocarbon group optionally containing a substituent. It is represented by the following general formula (104):

$$R^{30}{}_nM^{30}X^{30}{}_{m-n} \qquad \text{General formula (104)}$$

where $R^{30}$ is a hydrocarbon group containing 1 to 12 carbon atoms and optionally containing a substituent; $M^{30}$ is a metal selected from the group consisting of Groups 1, 2, 12 and 13 of the periodic table; $X^{30}$ is a halogen atom or a hydrogen atom; m is the valence of $M^{30}$; and n is from 1 to m.

As the organometallic compound represented by the general formula (104), examples include, but are not limited to, alkylaluminums such as tri-n-butylaluminum, tri-n-hexylaluminum, tri-n-octylaluminum and tri-n-decylaluminum, and alkylaluminum halides such as methylaluminum dichloride, ethylaluminum dichloride, dimethylaluminum chloride, diethylaluminum chloride and diethylaluminum ethoxide. Of them, trialkylaluminum is preferred.

The organometallic compound is more preferably trialkylaluminum containing a hydrocarbon group containing 4 or more carbon atoms, even more preferably trialkylaluminum containing a hydrocarbon group containing 6 or more carbon atoms, still more preferably tri-n-hexylaluminum, tri-n-octylaluminum or tri-n-decylaluminum, and most preferably tri-n-octylaluminum.

From the viewpoint of polymerization activity and costs, the amount of the organometallic compound brought into contact is such an amount that gives a mol ratio of from $10^{-5}$ to 0.9, preferably from $10^{-4}$ to 0.2, and more preferably from $10^{-4}$ to 0.1, with respect to the comonomer.

Amount of Residual Aluminum (Al)

In the multi-component copolymer (D) of the present invention, the amount of residual aluminum (Al) in the copolymer is preferably small.

The amount of the residual aluminum (Al) per gram of the multi-component copolymer (D) is preferably 100,000 µgAl/g or less, more preferably 70,000 µgAl/g or less, even more preferably 20,000 µgAl/g or less, still more preferably 10,000 µgAl/g or less, yet more preferably 5,000 µgAl/g or less, particularly preferably 1,000 µgAl/g or less, and most preferably 500 µgAl/g or less. If the amount is more than this, a reduction in the mechanical properties of the multi-component copolymer, the discoloration or accelerated deterioration of the polymerized product, etc., may occur. The amount of the residual aluminum (Al) is preferably as small as possible. For example, it may be a very small amount of about 1 µgAl/g, or it may be 0 µgAl/g (that is, the residual aluminum is not contained). The unit "µgAl/g" means that the amount of the contained aluminum (Al) per gram of the multi-component copolymer is represented in the unit of µg.

Residual Aluminum (Al) Amount Calculation Method

The amount of the aluminum (Al) contained in the multi-component copolymer (D) of the present invention can be calculated as the value which is obtained by dividing the amount of the aluminum contained in the alkylaluminum submitted for polymerization, by the yield of the thus-obtained multi-component copolymer (D).

Also, the amount of the aluminum (Al) contained in the multi-component copolymer (D) may be calculated from the amount of the alkylaluminum used for polymerization, or it may be measured by X-ray fluorescence spectrometry or inductively coupled plasma (ICP) emission spectrometry. In the case of using X-ray fluorescence spectrometry or ICP emission spectrometry, for example, the amount may be measured by the following X-ray fluorescence spectrometry or by the following inductively coupled plasma (ICP) emission spectrometry.

1) X-Ray Fluorescence Spectrometry

A sample of 3 g to 10 g is weighed out and heat-pressed by a heat press machine to produce a plate-shaped sample having a diameter of 45 mm. Only the central portion of the plate-shaped sample, which has a diameter of 30 mm, is measured in the following conditions by use of scanning X-ray fluorescence spectrometer "ZSX100E" (Rh tube, 4.0 kW) manufactured by Rigaku Corporation.

X-ray output: 50 kV-50 mA
Analyzing crystal: PET
Detector: Proportional counter (PC)
Detection line: Al-Kα

The contained aluminum amount can be obtained from a calibration curve prepared in advance and the result of the measurement carried out in the above conditions. The calibration curve can be prepared as follows: the amount of aluminum contained in each of polyethylene resins, is measured by ICP emission spectrometry. and X-ray fluorescence spectrometry of the polyethylene resins is carried out in the above conditions, thereby preparing the calibration curve.

2) Inductively Coupled Plasma (ICP) Emission Spectrometry

A sample, 3 ml of nitric acid (special grade) and 1 ml of hydrogen peroxide solution (hydrogen peroxide: 30% by weight) are put in a Teflon (trade name) container. Thermal decomposition operation is carried out at a maximum of 500 W by a microwave digestion device (MLS-1200MEGA manufactured by Milestone General K. K.) to make the sample into a solution. By analyzing the solution with an ICP emission spectrometer (IRIS-AP manufactured by Thermo Jarrell Ash Corporation), the amount of contained aluminum can be measured. The contained aluminum amount is quantitated by use of a calibration curve prepared with a standard solution at a known aluminum element concentration.

The method for polymerizing the multi-component copolymer (D) or multi-component copolymer precursor (Dp) of the present invention is not particularly limited.

As the polymerizing method, examples include, but are not limited to, the following methods: slurry polymerization in which at least part of a produced polymer is made into slurry in a medium, bulk polymerization in which a liquefied monomer itself is used as a medium, gas phase polymerization carried out in a vaporized monomer, and high-pressure ionic polymerization in which at least part of a produced polymer is dissolved in a monomer liquefied at high temperature and high pressure.

The polymerizing method may be any of batch polymerization, semi-batch polymerization and continuous polymerization.

Also, living polymerization may be carried out, or polymerization may be carried out with accompanying chain transfer.

In the polymerization, a chain shuttling reaction or a coordinative chain transfer polymerization (CCTP) may be carried out by use of a so-called chain shuttling agent (CSA).

Detailed production processes and conditions may be appropriately selected. For example, JP-A Nos. 2010-260913 and 2010-202647 may be referred to for the processes and conditions.

In the case of obtaining the multi-component copolymer (D) by converting the carboxylic acid ester group of the structural unit (Bp) in the multi-component copolymer precursor (Dp) into a carboxy group by thermal decomposition or hydrolysis, in the thermal decomposition or hydrolysis, a conventionally-known acid-base catalyst may be used as a reaction promoting additive. The acid-base catalyst is not particularly limited. As the acid-base catalyst, for example, a hydroxide of an alkali metal or alkaline-earth metal (such as sodium hydroxide, potassium hydroxide and lithium hydroxide), a carbonate of an alkali metal or alkaline-earth metal (such as sodium hydrogen carbonate and sodium carbonate), a solid acid (such as montmorillonite), an inorganic acid (such as hydrochloric acid, nitric acid and sulfuric acid) or an organic acid (such as formic acid, acetic acid, benzoic acid, citric acid, paratoluenesulfonic acid, trifluoroacetic acid and trifluoromethanesulfonic acid) may be appropriately used.

From the viewpoint of reaction acceleration effects, costs, device corrosion, etc., preferred are sodium hydroxide, potassium hydroxide, sodium carbonate, paratoluenesulfonic acid and trifluoroacetic acid, and more preferred are paratoluenesulfonic acid and trifluoroacetic acid.

(6-2) Converting Step into the Metal-Containing Carboxylate

The method for producing the multi-component ionomer of the present invention includes the step of converting at least a part of at least one selected from the group consisting of a carboxy group and a dicarboxylic anhydride group of the structural unit (B) of the multi-component copolymer (D) into the metal-containing carboxylate by reaction with the compound containing at least one metal ion selected from the group consisting of Groups 1, 2 and 12 of the periodic table.

The converting step may be the following converting step: the carboxylic acid ester group of the structural unit (Bp) in the multi-component copolymer precursor (Dp) is converted into a carboxy group by thermal decomposition or hydrolysis, thereby obtaining the multi-component copolymer (D); moreover, at the same time, at least a part of at least one selected from the group consisting of a carboxy group and a dicarboxylic anhydride group of the structural unit (B) of the multi-component copolymer (D) is converted into the metal-containing carboxylate by reaction with the compound containing at least one metal ion selected from the group consisting of Groups 1, 2 and 12 of the periodic table.

The compound containing the metal ion may be an oxide, hydroxide, carbonate, bicarbonate, acetate, formate or the like of a metal of Group 1, 2 or 12 of the periodic table.

The compound containing the metal ion may be supplied to the reaction system in a particulate or fine powder form; it may be dissolved or dispersed in water or organic solvent, and then the mixture may be supplied to the reaction system; or a masterbatch may be prepared by using an ethylene/unsaturated carboxylic acid copolymer or an olefin copolymer as a base polymer and then supplied to the reaction system. For smooth reaction, the method of preparing the masterbatch and supplying the compound containing the metal ion to the reaction system, is preferred.

The reaction with the compound containing the metal ion may be developed by melt-kneading with various kinds of devices such as a vented extruder, a banbury mixer and a roll mill, and the reaction may be a batch reaction or a continuous reaction. The reaction can be smoothly developed by discharging water and carbon dioxide, which are by-products produced by the reaction, with a deaerator. Accordingly, it is preferable to continuously develop the reaction by use of an extruder furnished with a deaerator, such as a vented extruder.

In the reaction with the compound containing the metal ion, a small amount of water may be injected for accelerating the reaction.

In the case of obtaining the multi-component copolymer (D) by converting the carboxylic acid ester group of the structural unit (Bp) in the multi-component copolymer precursor (Dp) into a carboxy group by thermal decomposition, the temperature of heating the multi-component copolymer precursor (Dp) may be a temperature at which the carboxylic acid ester group is converted into a carboxy group. When the heating temperature is too low, the carboxylic acid ester group cannot be converted into a carboxy group. When the heating temperature is too high, decarbonylation or copolymer decomposition may proceed. Accordingly, the heating temperature is preferably from 60° C. to 350° C., more preferably from 70° C. to 340° C., even more preferably from 80° C. to 330° C., still more preferably from 100° C. to 330° C., particularly preferably from 150° C. to 320° C., and most preferably from 200° C. to 320° C.

The reaction time varies depending on the heating temperature, the reactivity of the ester group moiety, etc. The reaction time is generally from 1 minute to 50 hours, preferably from 2 minutes to 30 hours, more preferably from 2 minutes to 10 hours, even more preferably from 2 minutes to 5 hours, and particularly preferably from 3 minutes to 4 hours.

Heating is preferably carried out even in the case of reacting at least a part of at least one selected from the group consisting of a carboxy group and a dicarboxylic anhydride group of the structural unit (B) of the multi-component copolymer (D) with the compound containing at least one metal ion selected from the group consisting of Groups 1, 2 and 12 of the periodic table.

The heating temperature is preferably from 80° C. to 350° C., more preferably from 100° C. to 340° C., even more preferably from 150° C. to 330° C., and still more preferably from 200° C. to 320° C.

The reaction time varies depending on the heating temperature, the reactivity, etc. The reaction time is generally from 1 minute to 50 hours, preferably from 2 minutes to 30 hours, more preferably from 2 minutes to 10 hours, even more preferably from 2 minutes to 5 hours, and particularly preferably from 3 minutes to 4 hours.

The reaction atmosphere of the converting step is not particularly limited. In general, the converting step is preferably carried out under an inert gas flow. As the inert gas, for example, nitrogen atmosphere, argon atmosphere or carbon dioxide atmosphere can be used. Commingling of a small amount of oxygen or air is allowable.

A reactor is used in the converting step, and the reactor is not particularly limited. The reactor is not limited, as long as the copolymer can be substantially uniformly stirred. As the reactor, a glass container or an autoclave (AC) furnished with a stirrer may be used. Also, any conventionally-known kneader may be used, such as Brabender Plastograph, a single or twin screw extruder, a high-power screw kneader, a banbury mixer, a kneader and a roller.

(7) Multi-Component Ionomer Resin Material

The multi-component ionomer of the present invention may be mixed with conventionally-known additives as long as it does not depart from the gist of the present invention, such as an antioxidant, an ultraviolet absorber, a lubricant, an antistatic agent, a colorant, a pigment, a crosslinking agent, a foaming agent, a nucleating agent, a flame retardant, an electroconductive material and a filler. The thus-obtained mixture may be used as a multi-component ionomer resin material.

(8) Different Kind of Highly-Polar Materials

The multi-component ionomer of the present invention has excellent adhesion performance to different kinds of highly-polar materials. As the different kinds of highly-polar materials of the present invention, which can exert excellent adhesion performance, examples include, but are not limited to, polyethylene-based resin such as an ethylene-vinyl acetate copolymer and an ethylene-acrylic acid ester copolymer; vinyl-based resin such as polyvinyl chloride, polyvinylidene chloride, polystyrene, polyacrylate and polyacrylonitrile; polyamide-based resin such as Nylon 6, Nylon 66, Nylon 10, Nylon 11, Nylon 12, Nylon 610 and polymethaxylylene adipamide; polyester-based resin such as polyethylene terephthalate, polyethylene terephthalate/isophthalate, polybutylene terephthalate, polylactic acid, polybutylene succinate and aromatic polyesters; polyvinyl alcohol; an ethylene-vinyl alcohol copolymer; polycarbonate resin; adhesive fluorine resin; thermosetting resin such as phenolic resin, epoxy resin, urea resin, melamine resin, urea resin, alkyd resin, unsaturated polyester, polyurethane and thermosetting polyimide; a film or sheet (and an oriented or printed product thereof) of a thermoplastic resin having a film-forming ability, such as a cellulose polymer (e.g., cellophane); a metal foil or plate of aluminum, iron, copper, an alloy containing any of them as a main component, or the like; a film on which an inorganic oxide is deposited, such as a silica deposited plastic film and an alumina deposited plastic film; a film on which, for example, a metal (such as gold, silver and aluminum) or a compound other than the oxides of the metals is deposited; paper such as high-quality paper, kraft paper, paperboard, glassine paper and synthetic paper; cellophane; woven fabric; and non-woven fabric.

EXAMPLES

Hereinafter, the present invention will be described in more detail, with reference to examples and comparative examples. The present invention is not limited to these examples.

In the examples and the comparative examples, the measurement and evaluation of properties were carried out by the methods described below.

In Tables 1 to 8, "no data" means "not measured", and "not detected" means "less than detection limit".

<Measurement and Evaluation>

(1) Measurement of the Phase Angle δ at which the Absolute Value G* of the Complex Modulus is 0.1 MPa (G*=0.1 MPa)

1) Preparation and Measurement of a Sample

A sample was put in a mold for heating press having a thickness of 1 mm and pre-heated for 5 minutes in a heat pressing device with a surface temperature of 180° C. Then, pressurization and depressurization were repeatedly carried out on the sample to deaerate residual gas in the sample. In addition, pressurization at 4.9 MPa was carried out on the sample and kept for 5 minutes. Then, the sample was transferred to a pressing device with a surface temperature of 25° C. and kept at a pressure of 4.9 MPa for 3 minutes to cool down, thereby producing a pressed plate composed of the sample having a thickness of about 1.0 mm. The pressed plate composed of the sample was formed into a circle having a diameter of 25 mm and used as a measurement sample. Using an ARES-type rotational rheometer (manufactured by Rheometrics) as a dynamic viscoelasticity measuring device, the dynamic viscoelasticity of the sample was measured under a nitrogen atmosphere in the following conditions.

2) Measurement Conditions

Plate: Parallel plate (diameter 25 mm)
Temperature: 160° C.
Distortion amount: 10%
Measurement angular frequency range: $1.0 \times 10^{-2}$ rad/s to $1.0 \times 10^{2}$ rad/s
Measurement interval: 5 points/decade The phase angle δ was plotted with respect to the common logarithm log G* of the absolute value G* (Pa) of the complex modulus. The value of δ (degree) of a point corresponding to log G*=5.0 was set as δ (G*=0.1 MPa). In a case where there is no point corresponding to log G*=5.0 in the measurement points, using two points around log G*=5.0, the δ value at log G*=5.0 was obtained by linear interpolation. When all the measured points corresponded to log G*<5, using the values of three points with larger log G* values, the δ value at log G*=5.0 in a quadratic curve, was obtained by extrapolation.

(2) Weight Average Molecular Weight (Mw) and Molecular Weight Distribution Parameter (Mw/Mn) Measurement The weight average molecular weight (Mw) was obtained by gel permeation chromatography (GPC). The molecular weight distribution parameter (Mw/Mn) was calculated as follows: in addition to the weight average molecular weight (Mw), the number average molecular weight (Mn) was obtained by gel permeation chromatography (GPC) and the ratio of Mw to Mn (Mw/Mn) was calculated.

The measurement was carried out by the following process and in the following conditions.
1) Pre-Treatment of the Sample When the sample contained a carboxy group, the sample was subjected to an esterification treatment such as methyl esterification using diazomethane or trimethylsilyl (TMS) diazomethane, for example. Then, the sample was used for measurement. When the sample contained a carboxylic acid salt group, the sample was subjected to an acid treatment to modify the carboxylic acid salt group to a carboxy group. Then, the sample was subjected to the above-described esterification treatment and used for measurement.

2) Preparation of a Sample Solution

First, 3 mg of the sample and 3 mL of o-dichlorobenzene were put in a 4 mL vial. The vial was sealed with a screw cap and a Teflon (trade name) septum. Then, the vial was shaken for hours with a high-temperature shaking device ("SSC-7300" manufactured by Senshu Scientific Co., Ltd.) at a temperature of 150° C. After the end of the shaking, the absence of insoluble matters in the sample was confirmed by visual observation.

3) Measurement

One high-temperature GPC column (SHOWDEX HT-G manufactured by Showa Denko K. K.) and two high-temperature GPC columns (SHOWDEX HT-806M manufactured by Showa Denko K. K.) were connected to ALLIANCE GPCV2000 (manufactured by Waters Corporation). As an eluent, o-dichlorobenzene was used. GPC measurement was carried out at a temperature of 145° C. and a flow rate of 1.0 mL/min.

4) Calibration Curve

For calibration of the columns, monodisperse polystyrenes manufactured by Showa Denko K. K. (0.07 mg/ml solutions of S-7300, S-3900, S-1950, S-1460, S-1010, S-565, S-152, S-66.0, S-28.5 and S-5.05), n-eicosane and n-tetracontane were measured in the same condition as above, and the logarithmic value of elution time and molecular weight were approximated by a quartic equation. The following formula was used for conversion of polystyrene molecular weight ($M_{PS}$) and polyethylene molecular weight ($M_{PE}$).

$$M_{PE} = 0.468 \times M_{PS}$$

(3) Melt Flow Rate (MFR)

In accordance with Condition 7 in Table 1 in JIS K 7210:1999, MFR was measured at a temperature of 190° C. and a load of 21.18 N.

(4) Tensile Test

A 1 mm-thick sheet was produced from the sample by the method (cooling method A) described in JIS K 7151:1995. The sheet was cut to produce a type 5B small sample described in JIS K 7162:1994. Using the sample, a tensile test was carried out according to JIS K 7161:1994 at a temperature of 23° C. to measure the tensile modulus, tensile stress at break, tensile elongation at break and tensile impact strength of the sample. The testing rate was set to 10 mm/min.

(5) Melting Point and Crystallinity

The melting point of the sample was indicated by the peak temperature of an endothermic curve measured by a differential scanning calorimeter (DSC). The DSC (product name: DSC 7020, manufactured by SII NanoTechnology Inc.) was used for measurement in the following measurement conditions.

First, the sample (about 5.0 mg) was packed in an aluminum pan. The temperature of the sample was increased to 200° C. at a rate of 10° C./min, kept at 200° C. for 5 minutes, decreased to 30° C. at a rate of 10° C./min, kept at 30° C. for 5 minutes, and then increased again at a rate of 10° C./min to obtain an absorption curve. In the absorption curve, the maximum peak temperature was determined as a melting point (Tm), and a melting heat (ΔH) was obtained from the melting endothermic peak area. The melting heat was divided by the melting heat (293 J/g) of a perfect crystal of high-density polyethylene (HDPE) to obtain a crystallinity (%).

(6) Method for Measuring the Amounts of the Structural Units Derived from the Monomer Containing at Least One Selected from the Group Consisting of a Carboxy Group and a Dicarboxylic Anhydride Group and the Acyclic Monomer and the Number of the Branches Per 1,000 Carbon Atoms The amounts of the structural units derived from the monomer containing at least one selected from the group consisting of a carboxy group and a dicarboxylic anhydride group and the acyclic monomer in the multi-component copolymer of the present invention, and the number of the branches per 1,000 carbon atoms, were obtained by use of a $^{13}$C-NMR spectrum. $^{13}$C-NMR was measured by the following method.

First, 200 mg to 300 mg of a sample, 2.4 ml of a mixed solvent of o-dichlorobenzene ($C_6H_4Cl_2$) and deuterated benzene bromide ($C_6D_5Br$) ($C_6H_4Cl_2/C_6D_5Br=2/1$ (volume ratio)) and hexamethyldisiloxane used as a chemical shift standard, were put in an NMR sample tube having an inner diameter of 10 mm. After nitrogen substitution, the tube was sealed. The materials were dissolved by heating to obtain a homogenous solution, which was used as an NMR measurement sample.

NMR measurement was carried out at 120° C. by use of an NMR instrument (AV400M manufactured by Bruker Japan K. K.) furnished with a 10 mm-diameter cryoprobe.

The $^{13}$C-NMR measurement conditions were as follows.
Sample temperature: 120° C.
Pulse angle: 90°
Pulse interval: 51.5 sec
Accumulated number of times: 512 or more
Measurement method: Inverse gated decoupling The $^{13}$C signal of hexamethyldisiloxane was set to 1.98 ppm, and the chemical shifts of other $^{13}$C signals were based on this.

1) Pre-Treatment of the Sample

When the sample contained a carboxylic acid salt group, the sample was subjected to an acid treatment to modify the carboxylic acid salt group to a carboxy group. Then, the sample was used for measurement. When the sample contained a carboxy group, the sample may be appropriately subjected to an esterification treatment such as methyl esterification using diazomethane or trimethylsilyl (TMS) diazomethane, for example.

2) Calculation of the Amounts of the Structural Units Derived from the Monomer Containing at Least One Selected from the Group Consisting of a Carboxy Group and a Dicarboxylic Anhydride Group and the Acyclic Monomer <E/tBA>

The quaternary carbon signal of the t-butyl acrylate group of t-butyl acrylate (tBA) is detected at 79.6 ppm to 78.8 ppm of the 13C-NMR spectrum. Using these signal intensities, the comonomer amount was calculated from the following formula.

$$tBA \text{ total amount (mol \%)} = I(tBA) \times 100 / [I(tBA) + I(E)]$$

In this formula, I(tBA) and I(E) are amounts represented by the following formulae.

$$I(tBA) = I_{79.6-78.8}$$

$$I(E) = (I_{180.0-135.0} + I_{120.0-5.0} - I(tBA) \times 7)/2$$

<E/tBA/nBA>

The quaternary carbon signal of the t-butyl acrylate group of tBA is detected at 79.6 ppm to 78.8 ppm of the $^{13}$C-NMR spectrum, and the methylene signal of the butoxy group of n-butyl acrylate (nBA) is detected at 64.1 ppm to 63.4 ppm of the $^{13}$C-NMR spectrum. Using these signal intensities, the comonomer amount was calculated from the following formulae.

$tBA$ total amount (mol %)=$I(tBA)\times 100/[I(tBA)+I(nBA)+I(E)]$ $nBA$ total amount (mol %)=$I(nBA)\times 100/[I(tBA)+I(nBA)+I(E)]$ In the formulae, I(tBA), I(nBA) and I(E) are amounts represented by the following formulae.

$I(tBA)=I_{79.6-78.8}$ $I(nBA)=I_{64.1-63.4}$ $I(E)=(I_{180.0-135.0}+I_{120.0-5.0}-I(nBA)\times 7-I(tBA)\times 7)/2$ <E/tBA/iBA>

The quaternary carbon signal of the t-butyl acrylate group of tBA is detected at 79.6 ppm to 78.8 ppm of the $^{13}$C-NMR spectrum; the methylene signal of the isobutoxy group of i-butyl acrylate (iBA) is detected at 70.5 ppm to 69.8 ppm of the $^{13}$C-NMR spectrum; and the methyl signal of the isobutoxy group is detected at 19.5 ppm to 18.9 ppm of the $^{13}$C-NMR spectrum. Using these signal intensities, the comonomer amount was calculated from the following formulae.

$tBA$ total amount (mol %)=$I(tBA)\times 100/[I(tBA)+I(iBA)+I(E)]$ $iBA$ total amount (mol %)=$I(iBA)\times 100/[I(tBA)+I(iBA)+I(E)]$ In the formulae, I(tBA), I(iBA) and I(E) are amounts represented by the following formulae.

$I(tBA)=I_{79.6-78.8}$ $I(iBA)=(I_{70.5-69.8}+I_{19.5-18.9})/3$ $I(E)=(I_{180.0-135.0}+I_{120.0-5.0}-I(iBA)\times 7-I(tBA)\times 7)/2$ If the structural unit amount of a monomer is represented by "<0.1" including an inequality sign, it means that while the monomer is present as a constitutional unit of the multi-component copolymer, the amount is less than 0.1 mol % considering the significant figure.

3) Calculation of the Number of Branches Per 1,000 Carbon Atoms

There are the following types of multi-component copolymers: an isolated type (a branch is present alone in the main chain) and a complex type such as a facing type (a branch faces another branch via the main chain), a branched-branch type (a branched chain further includes a branch) and a sequence type.

Ethyl branch structure examples are shown below. In the facing type example, R represents an alkyl group.

Ethyl branch (isolated type)

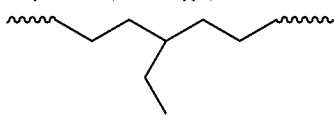

Ethyl branches (complex type)

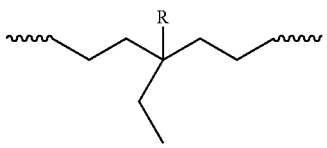

Facing type

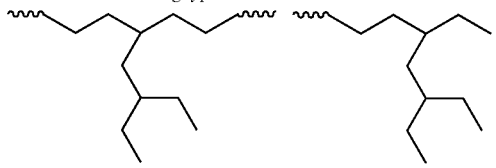

Branched-branch type

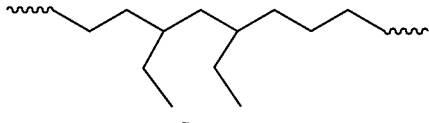

Sequence type

The number of branches per 1,000 carbon atoms is obtained by plugging in any of the following I(B1), I(B2) and I(B4) for I(branch) in the following formula. B1 denotes methyl branch; B2 denotes ethyl branch; and B4 denotes butyl branch. The number of methyl branches is obtained by use of I(B1); the number of ethyl branches is obtained by use of I(B2); and the number of butyl branches is obtained by use of I(B4).

Number of branches (per 1,000 carbon atoms)=$I(\text{branch})\times 1000/I(\text{total})$ In this formula, I(total), I(B1), I(B2) and I(B4) are amounts indicated by the following formulae.

$I(\text{total})=I_{180.0-135.0}+I_{120.0-5.0}$ $I(B1)=(I_{20.0-19.8}+I_{33.2-33.1}+I_{137.5-37.3})/4$ $I(B2)=I_{8.6-7.6}+I_{11.8-10.5}$ $I(B4)=I_{14.3-13.7}-I_{32.2-32.0}$ In the formulae, I denotes integrated intensity, and numeral subscripts following I indicate a chemical shift range. For example, $I_{180.0-135.0}$ indicates the integrated intensity of $^{13}$C signals detected between 180.0 ppm to 135.0 ppm.

The following non-patent literatures were referred to for assignment: Macromolecules 1984, 17, 1756-1761 and Macromolecules 1979, 12, 41.

If the number of branches is represented by "<0.1" including an inequality sign, it means that while the branches are present as a constitutional unit of the multi-component copolymer, the amount is less than 0.1 mol % considering the significant figure. Also, "not detected" means "less than detection limit".

(7) Infrared Absorption Spectrum

The sample was melted at 180° C. for 3 minutes and then subjected to compression forming to produce a film having a thickness of about 50 µm. The film was analyzed by Fourier transform infrared spectroscopy to obtain an infrared absorption spectrum.

Product name: FT/IR-6100 (manufactured by JASCO Corporation)
Measurement method: Transmission method
Detector: Triglycine sulfate (TGS)
Accumulated number of times: 16 to 512
Resolving power: 4.0 cm$^{-1}$
Measurement wavelength: 5000 cm$^{-1}$ to 500 cm$^{-1}$ (8) Aluminum (Al) Adhesion Strength The aluminum (Al) adhesion strength was measured as follows: a sample formed into a pressed plate and an aluminum sheet were stacked; the stack was heat-pressed to produce a laminate; and the laminate was subjected to a peeling test, thereby measuring the aluminum (Al) adhesion strength. The method for producing the pressed plate, the method for producing the laminate and the method for measuring the adhesion strength will be described in order.

1) Method for Producing the Pressed Plate

The sample was put in a mold for heating press having a thickness of 0.5 mm and a size of 50 mm×60 mm and pre-heated for 5 minutes in a heat pressing device with a surface temperature of 180° C. Then, pressurization and depressurization were repeatedly carried out on the sample to deaerate residual gas in the sample. In addition, pressurization at 4.9 MPa was carried out on the sample and kept for 3 minutes. Then, the sample was transferred to a pressing device with a surface temperature of 25° C. and kept at a pressure of 4.9 MPa for 3 minutes to cool down, thereby producing a pressed plate having a thickness of about 0.5 mm.

2) Method for Producing the Laminate of the Sample and the Aluminum (Al) Sheet

The sample pressed plate obtained by the pressed plate production method and a commercially-available, 50 µm-thick aluminum sheet (manufactured by UACJ Corporation, 1N30_H18_B1-1 (JIS 1N30, hard double-sided glossy specification)) were cut in a size of 50 mm×60 mm. The surface of the sample pressed plate and that of the aluminum sheet were wiped with a cloth impregnated with ethanol. The wiped surface of the sample pressed plate and that of the aluminum sheet were stacked on each other, and they were put in a mold for heating press having a thickness of 0.5 mm and a size of 50 mm×60 mm. Pressurization at 4.9 MPa was carried out thereon for 5 minutes in a heat pressing device with a surface temperature of 180° C. Then, the resultant product was transferred to a pressing device with a surface temperature of 25° C. and kept at a pressure of 4.9 MPa for 3 minutes to cool down, thereby producing the laminate of the sample pressed plate and the aluminum sheet.

3) Method for Measuring the Adhesion Strength of the Laminate

The laminate obtained by the laminate production method was cut in a width of 10 mm. T-peeling of the cut laminate was carried out by use of a tensilon tension tester (manufactured by Toyo Seiki Seisaku-sho, Ltd.) at a rate of 50 mm/min, thereby measuring the adhesion strength. The adhesion strength was represented in the unit of N/10 mm. If the adhesion strength was very strong, the sample layer or substrate layer yields and further breaks in the peeling test. This is a phenomenon that occurs since the adhesion strength of the laminate is high compared to the lower one of the tensile strength at break of the sample layer and that of the substrate layer, and in such a case that the adhesion is determined to be very high. When the adhesion strength cannot be measured due to the phenomenon, the adhesion strength measurement result is labeled as "non-peelable", and it is decided that they were more highly attached than those for which the adhesion strength value was measured.

<Synthesis of Metal Complex>

(1) Synthesis of B-27DM/Ni Complex (B-27DM/Ni Catalyst)

In accordance with Synthesis Example 4 described in WO2010/050256, the B-27DM/Ni complex used the following 2-bis(2,6-dimethoxyphenyl) phosphano-6-pentafluorophenylphenol ligand (B-27DM). In accordance with Example 1 in WO2010/050256, using bis(1,5-cyclooctadiene) nickel (0) (hereinafter referred to as Ni(COD)$_2$), a nickel complex (B-27DM/Ni) in which B-27DM and Ni(COD)$_2$ were reacted at 1:1, was synthesized.

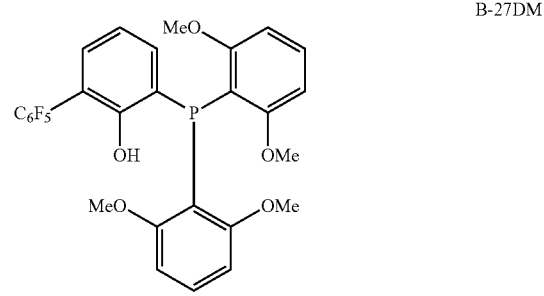

B-27DM (2) Synthesis of B-423/Ni Complex (B-423/Ni Catalyst)

1) Synthesis of Ligand B-423:2-bis(2,6-dimethoxyphenyl)phosphano-6-(2,6-diisopropylphenyl)phenol

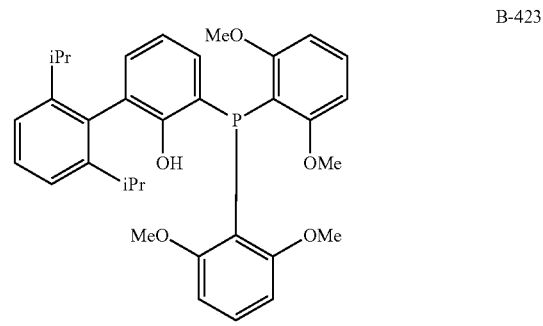 [SMILES: COc1cccc(OC)c1P(c1cccc(-c2c(C(C)C)cccc2C(C)C)c1O)c1c(OC)cccc1OC]

B-423

Ligand B-423 was synthesized according to the following scheme.

In chemical formulae mentioned below, —OMOM represents methoxymethoxy group (—OCH$_2$OCH$_3$).

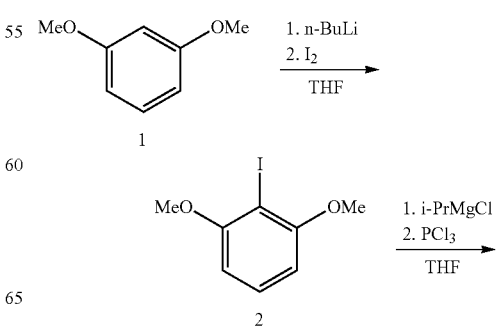

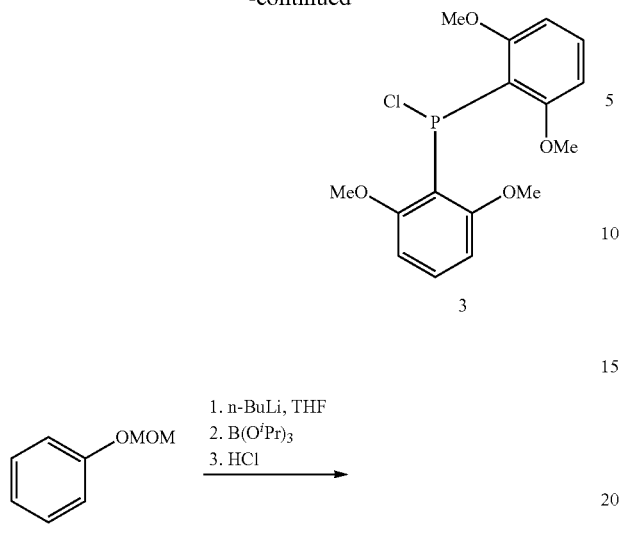

(i) Synthesis of Compound 2

The compound 2 was synthesized according to Patent Literature WO2010/050256.

(ii) Synthesis of Compound 3

To a THF (5.0 ml) solution of the compound 2 (2.64 g, 10.0 mmol), iso-PrMgCl (2 M, 5.25 ml) was added at 0° C. A reaction mixture thus obtained was stirred at 25° C. for 1 hour. Then, to the reaction mixture, PCl$_3$ (618 mg, 4.50 mmol) was added at −78° C.

The temperature of the reaction mixture was increased to 25° C. for 3 hours, thereby obtaining a yellow suspension. The solvent of the suspension was removed by distillation under reduced pressure, thereby obtaining a yellow solid. The mixture was used in the next reaction, without purification.

(iii) Synthesis of Compound 5

To a THF (250 ml) solution of a compound 4 (30 g, 220 mmol), n-BuLi (2.5 M, 96 ml) was added at 0° C. A solution thus obtained was stirred at 30° C. for 1 hour. To the solution, B(O$^i$Pr)$_3$ (123 g, 651 mmol) was added at −78° C., and a reaction mixture was stirred at 30° C. for 2 hours, thereby obtaining a white suspension.

Hydrochloric acid (1 M) was added to the suspension to adjust the pH to 6 to 7 (pH=6 to 7). An organic layer thus obtained was concentrated to obtain a mixture.

The obtained mixture was washed with petroleum ether (80 ml), thereby obtaining the compound 5 (26 g).

(iv) Synthesis of Compound 7

The compound 5 (5.00 g, 27.5 mmol), a compound 6 (4.42 g, 18.3 mmol), Pd$_2$(dba)$_3$ (168 mg, 0.183 mmol), s-Phos (2-dicyclohexylphosphino-2',6'-dimethoxybiphenyl) (376 mg, 0.916 mmol) and K$_3$PO$_4$ (7.35 g, 34.6 mmol) were put in a reaction container. Toluene (40 ml) was added thereto. A solution thus obtained was reacted at 110° C. for 12 hours, thereby obtaining a black suspension.

H$_2$O (50 ml) was added to the suspension. The suspension was extracted three times with EtOAc (55 ml).

An organic layer was washed with brine (20 ml) and dehydrated with Na$_2$SO$_4$.

The organic layer was filtered, and the solvent was removed by distillation under reduced pressure. Then, a residual was purified with a silica gel column, thereby obtaining an oily substance (1.3 g).

(v) Synthesis of Compound 8

To a THF (40 ml) solution of the compound 7 (6.5 g, 22 mmol), n-BuLi (2.5 M, 9.15 ml) was added dropwise at 0° C. The temperature of the solution was increased to 30° C. and stirred for 1 hour. A reaction solution thus obtained was cooled to −78° C., and CuCN (2.1 g, 23 mmol) was added thereto. The solution was stirred at 30° C. for 1 hour.

The reaction solution was cooled to −78° C., and a THF (40 ml) solution of the compound 3 (6.7 g, 20 mmol) was added thereto. The solution was stirred at 30° C. for 12 hours, thereby obtaining a white suspension.

$H_2O$ (50 ml) was added to the suspension. As a result, a white precipitate was produced.

The white precipitate was collected by filtration and dissolved in dichloromethane (20 ml). Ammonia water (80 ml) was added thereto, and the mixed solution was stirred for 3 hours.

A product thus obtained was extracted three times with dichloromethane (50 ml), dehydrated with $Na_2SO_4$ and then concentrated, thereby obtaining a yellow oily substance. The oily substance was purified with a silica gel column, thereby obtaining the compound 8 (2.9 g).

(vi) Synthesis of B-423

To a dichloromethane (20 ml) solution of the compound 8 (2.9 g, 4.8 mmol), HCl/EtOAc (4 M, 50 ml) was added at 0° C. The solution was stirred at 30° C. for 2 hours, thereby obtaining a light yellow solution.

The solvent of the solution was removed by distillation under reduced pressure. To a residual, dichloromethane (50 ml) was added.

The residual was washed with a saturated $NaHCO_3$ aqueous solution (100 ml), thereby obtaining B-423 (2.5 g).

The NMR assigned value of the obtained ligand B-423 is shown below.

[NMR]
$^1$H NMR (CDCl$_3$, δ, ppm): 7.49 (t, 1H), 7.33 (t, 1H), 7.22 (m, 4H), 6.93 (d, 1H), 6.81 (t, 1H), 6.49 (dd, 4H), 6.46 (br, 1H), 3.56 (s, 12H), 2.63 (sept, 2H), 1.05 (d, 6H), 1.04 (d, 6H);
$^{31}$P NMR (CDCl$_3$, δ, ppm): −61.6 (s).

2) Synthesis of B-423/Ni Complex

The following operation was all carried out under a nitrogen atmosphere.

Hereinafter, nickel acetylacetone will be referred to as Ni(acac)$_2$.

Ni(acac)$_2$ (90.0 mg, 0.35 mol) was dissolved in toluene (30 mL). The solution was added to B-423 (200 mg, 0.36 mmol) obtained above as a ligand.

A reaction solution was stirred for 10 minutes at room temperature. Then, a solvent was removed from the reaction solution by distillation under reduced pressure, thereby obtaining a deep red purple solid.

The solid was washed twice with hexane (10 mL) and then dried under reduced pressure, thereby obtaining a red purple solid (yield 247 g, yield 99%). The NMR assigned value of the obtained metal complex is shown below.

[NMR]
$^1$HNMR (C$_6$D$_6$, δ, ppm): 7.65 (d, 1H), 7.25-7.35 (m, 3H), 7.07 (t, 2H), 6.97 (d, 1H), 6.51 (t, 1H), 6.26 (d, 4H), 4.83 (brs, 1H), 3.44 (s, 12H), 3.14 (sept, 2H), 1.44 (d, 6H), 1.29 (s, 6H), 1.21 (d, 6H)

<Production of Multi-Component Copolymers>

Production Example 1

(1) Production of Multi-Component Copolymer Precursor (Dp)
Production of an Ethylene/t-Butyl Acrylate/i-Butyl Acrylate Ternary Copolymer (E/tBA/iBA Copolymer 1)

Dry toluene (1000 L), tri-n-octylaluminum (TNOA) (35 g, 95 mmol), a predetermined amount (4.4 kg, 35 mol) of t-butyl acrylate (tBA) and a predetermined amount (1.6 kg, 12 mol) of i-butyl acrylate (iBA) were put in an autoclave (inner volume 1.6 m$^3$) furnished with stirring vanes.

The temperature of the autoclave was increased to 95° C. with stirring the mixture. Then, ethylene was supplied to the autoclave to adjust the pressure to 0.8 MPa.

After the adjustment, the B-423/Ni catalyst was supplied to initiate copolymerization.

During the reaction, the temperature was kept at 95° C., and the B-423/Ni catalyst (1460 mmol) and TNOA (3478 mmol) were supplied in several batches. Ethylene was further supplied to keep the pressure, and tBA and iBA were further supplied at a mol ratio of ethylene:tBA:iBA=92.3:5.4:2.3. After the mixture was polymerized for 510 minutes, the reaction was terminated, thereby obtaining the E/tBA/iBA copolymer 1. The production results are shown in Table 1, and the physical properties of the obtained copolymer are shown in Table 2.

(2) Production of Multi-Component Copolymer (D) (Multi-Component Copolymer 1): Production of an Ethylene/Acrylic Acid/i-Butyl Acrylate Ternary Copolymer (E/AA/iBA Copolymer 1)

First, 40 g of the E/tBA/iBA copolymer 1, 0.8 g of p-toluenesulfonic acid monohydrate, and 185 ml of toluene were put in a 500 ml separable flask and stirred at 105° C. for 4 hours. Next, 185 ml of ion-exchanged water was added in the separable flask. The resulting solution was stirred and left to stand. Then, an aqueous layer thus formed was removed from the flask. Then, the addition of ion-exchanged water and the removal of the aqueous layer were repeated until the pH of the removed aqueous layer reached 5 or more. From the residual solution, the solvent was distilled under reduced pressure, and the resultant solution was dried until it reached a constant weight, thereby obtaining the E/AA/iBA copolymer 1.

An IR spectrum of the obtained resin showed that peaks around 850 cm$^{-1}$ disappeared, which are peaks derived from a tBu group; peaks around 1730 cm$^{-1}$ decreased, which are peaks derived from the carbonyl group of ester; and peaks around 1700 cm$^{-1}$ increased, which are peaks derived from the carbonyl group of carboxylic acid (a dimer).

As a result, the decomposition of the t-Bu ester and carboxylic acid formation were confirmed, and the E/AA/iBA copolymer 1 was obtained. The physical properties of the obtained resin are shown in Tables 3 and 4.

Production Example 2

(1) Production of Multi-Component Copolymer Precursor (Dp) Production of an Ethylene/t-Butyl Acrylate/n-Butyl Acrylate Ternary Copolymer (E/tBA/nBA Copolymer 2)

Dry toluene (1.0 L), tri-n-octylaluminum (TNOA) (55 mg, 0.15 mmol), a predetermined amount (29.0 ml, 200 mmol) of t-butyl acrylate (tBA) and a predetermined amount (8.6 ml, 60 mmol) of n-butyl acrylate (nBA) were put in an autoclave (inner volume 2.4 L) furnished with stirring vanes.

The temperature of the autoclave was increased to 90° C. with stirring the mixture, and nitrogen was supplied to 0.2 MPa. Then, ethylene was supplied to the autoclave to adjust the pressure to 3.2 MPa.

After the adjustment, the B-27DM/Ni catalyst (480 µmol) was injected with nitrogen to initiate copolymerization.

The mixture was polymerized for 92 minutes, cooled down and then depressurized to terminate the reaction.

A reaction solution was put in acetone (1 L) to precipitate a polymer. Then, the polymer was filtered, washed, collected and then dried under reduced pressure until it reached a constant weight, thereby obtaining the E/tBA/nBA copolymer 2. The production results are shown in Table 1, and the physical properties of the obtained copolymer are shown in Table 2.

(2) Production of Multi-Component Copolymer (D) (Multi-Component Copolymer 2): Production of Ethylene/Acrylic Acid/n-Butyl Acrylate Ternary Copolymer (E/AA/nBA Copolymer 2)

The E/AA/nBA copolymer 2 was obtained in the same manner as the production of the E/AA/iBA copolymer 1 of Production Example 1, except that the E/tBA/nBA copolymer 2 was used in place of the E/tBA/iBA copolymer 1. The physical properties of the obtained resin are shown in Tables 3 and 4.

Production Example 3

(1) Production of Multi-Component Copolymer Precursor (Dp) Production of an Ethylene/t-Butyl Acrylate/n-Butyl Acrylate Ternary Copolymer (E/tBA/nBA Copolymer 3)

The E/tBA/nBA copolymer 3 was obtained in the same manner as Production Example 2, except that the t-butyl acrylate (tBA) amount was changed to 35.1 ml (241 mmol); the n-butyl acrylate (nBA) amount was changed to 16.4 ml (115 mmol); the polymerization temperature was changed to 80° C.; and the polymerization time was changed to 180 minutes. The production results are shown in Table 1, and the physical properties of the obtained copolymer are shown in Table 2.

(2) Production of Multi-Component Copolymer (D) (Multi-Component Copolymer 3): Production of an Ethylene/Acrylic Acid/n-Butyl Acrylate Ternary Copolymer (E/AA/nBA Copolymer 3)

The E/AA/nBA copolymer 3 was obtained in the same manner as the production of the E/AA/iBA copolymer 1 of Production Example 1, except that the E/tBA/nBA copolymer 3 was used in place of the E/tBA/iBA copolymer 1. The physical properties of the obtained resin are shown in Tables 3 and 4.

Production Example 4

(1) Production of Multi-Component Copolymer Precursor (Dp)
Production of an Ethylene/t-Butyl Acrylate/n-Butyl Acrylate Ternary Copolymer (E/tBA/nBA Copolymer 4)

The E/tBA/nBA copolymer 4 was obtained in the same manner as Production Example 2, except that the t-butyl acrylate (tBA) amount was changed to 35.1 ml (241 mmol); the n-butyl acrylate (nBA) amount was changed to 10.2 ml (72 mmol); the B-27DM/Ni catalyst amount was changed to 360 µmol; and the polymerization time was changed to 88 minutes. The production results are shown in Table 1, and the physical properties of the obtained copolymer are shown in Table 2.

(2) Production of Multi-Component Copolymer (D) (Multi-Component Copolymer 4): Production of an Ethylene/Acrylic Acid/n-Butyl Acrylate Ternary Copolymer (E/AA/nBA Copolymer 4)

The E/AA/nBA copolymer 4 was obtained in the same manner as the production of the E/AA/iBA copolymer 1 of Production Example 1, except that the E/tBA/nBA copolymer 4 was used in place of the E/tBA/iBA copolymer 1. The physical properties of the obtained resin are shown in Tables 3 and 4.

Production Example 5

(1) Production of Multi-Component Copolymer Precursor (Dp) Production of an Ethylene/t-Butyl Acrylate/i-Butyl Acrylate Ternary Copolymer (E/tBA/iBA Copolymer 5)

The E/tBA/iBA copolymer 5 was obtained in the same manner as Production Example 2, except that i-butyl acrylate (iBA) was used in place of the n-butyl acrylate (nBA); the t-butyl acrylate (tBA) amount was changed to 17.0 ml (115 mmol); the i-butyl acrylate (iBA) amount was 14.0 ml (100 mmol); and the polymerization time was changed to 120 minutes. The production results are shown in Table 1, and the physical properties of the obtained copolymer are shown in Table 2.

(2) Production of Multi-Component Copolymer (D) (Multi-Component Copolymer 5): Production of Ethylene/Acrylic Acid/i-Butyl Acrylate Ternary Copolymer (E/AA/iBA Copolymer 5)

The E/AA/iBA copolymer 5 was obtained in the same manner as the production of the E/AA/iBA copolymer 1 of Production Example 1. The physical properties of the obtained resin are shown in Tables 3 and 4.

Production Example 6

(1) Production of Multi-Component Copolymer Precursor (Dp) Production of an Ethylene/t-Butyl Acrylate/i-Butyl Acrylate Ternary Copolymer (E/tBA/iBA Copolymer 6)

The E/tBA/iBA copolymer 6 was obtained in the same manner as Production Example 2, except that i-butyl acrylate (iBA) was used in place of the n-butyl acrylate (nBA); the t-butyl acrylate (tBA) amount was changed to 28 ml (190 mmol); the i-butyl acrylate (iBA) amount was 3 ml (22 mmol); and the polymerization time was changed to 55 minutes. The production results are shown in Table 1, and the physical properties of the obtained copolymer are shown in Table 2.

(2) Production of Multi-Component Copolymer (D) (Multi-Component Copolymer 6): Production of an Ethylene/Acrylic Acid/i-Butyl Acrylate Ternary Copolymer (E/AA/iBA Copolymer 6)

The E/AA/iBA copolymer 6 was obtained in the same manner as the production of the E/AA/iBA copolymer 1 of Production Example 1. The physical properties of the obtained resin are shown in Tables 3 and 4.

Production Example 7

(1) Production of Multi-Component Copolymer Precursor (Dp) Production of an Ethylene/t-Butyl Acrylate/i-Butyl Acrylate Ternary Copolymer (E/tBA/iBA Copolymer 7)

The E/tBA/iBA copolymer 7 was obtained in the same manner as Production Example 2, except that i-butyl acrylate (iBA) was used in place of the n-butyl acrylate (nBA); the t-butyl acrylate (tBA) amount was changed to 27.5 ml (189 mmol); the i-butyl acrylate (iBA) amount was 1 ml (7 mmol); the polymerization temperature was changed to 100° C.; and the polymerization time was changed to 29 minutes. The production results are shown in Table 1, and the physical properties of the obtained copolymer are shown in Table 2.

(2) Production of Multi-Component Copolymer (D) (Multi-Component Copolymer 7): Production of Ethylene/Acrylic Acid/i-Butyl Acrylate Ternary Copolymer (E/AA/iBA Copolymer 7)

The E/AA/iBA copolymer 7 was obtained in the same manner as the production of the E/AA/iBA copolymer 1 of Production Example 1. The physical properties of the obtained resin are shown in Tables 3 and 4.

Comparative Production Example 1

(1) Production of a Comparative Multi-Component Copolymer Precursor
Production of an Ethylene/t-Butyl Acrylate Binary Copolymer (E/tBA Copolymer C1)

Dry toluene (1000 L), tri-n-octylaluminum (TNOA) (50 g, 140 mmol) and a predetermined amount (8.5 kg, 66 mol) of t-butyl acrylate (tBA) were put in an autoclave (inner volume 1.6 m$^3$) furnished with stirring vanes.

The temperature of the autoclave was increased to 100° C. with stirring the mixture. Then, ethylene was supplied to the autoclave to adjust the pressure to 0.8 MPa.

After the adjustment, the B-27DM/Ni catalyst was supplied to initiate copolymerization.

During the reaction, the temperature was kept at 100° C., and the B-27DM/Ni catalyst (320 mmol) was supplied in several batches. Ethylene was further supplied to keep the pressure, and tBA was further supplied at a mol ratio of ethylene:tBA=94.4:5.6. After the mixture was polymerized for 240 minutes, the reaction was terminated, thereby obtaining the E/tBA copolymer C1. The production results are shown in Table 1, and the physical properties of the obtained copolymer are shown in Table 2.

(2) Production of a Comparative Multi-Component Copolymer (Comparative Multi-Component Copolymer C1): Production of an Ethylene/Acrylic Acid Binary Copolymer (E/AA Copolymer C1)

The E/AA copolymer C1 was obtained in the same manner as the production example of the E/AA/iBA copolymer 1, except that the E/tBA copolymer C1 was used. The physical properties of the obtained resin are shown in Tables 3 and 4.

Comparative Production Example 2

(Comparative Multi-Component Copolymer C2): Production of an Ethylene/Methacrylic Acid/i-Butyl Acrylate Copolymer (E/MAA/iBA Copolymer C2)

As a comparative multi-component copolymer C2, a polar group-containing olefin copolymer (MAA content: 4 wt % (1.5 mol %), iBA content: 16 wt % (4.1 mol %), MFR: 27 g/10 min) was used, which is an ethylene-methacrylic acid (MAA)-i-butyl acrylate (iBA) ternary copolymer produced by a high-pressure radical polymerization process. The physical properties of the resin are shown in Tables 3 and 4.

TABLE 1

Copolymer precursor production

| | Metal complex species | Metal complex amount mmol | TNOA mmol | Comonomer 1 | Comonomer 2 | Comonomer 1 Concentration mmol/L |
|---|---|---|---|---|---|---|
| Production Example 1 | B-423/Ni | 1460 | 3573 | t-Butyl acrylate | i-Butyl acrylate | 147 |
| Production Example 2 | B-27DM/Ni | 0.48 | 0.15 | t-Butyl acrylate | n-Butyl acrylate | 200 |
| Production Example 3 | B-27DM/Ni | 0.48 | 0.15 | t-Butyl acrylate | n-Butyl acrylate | 241 |
| Production Example 4 | B-27DM/Ni | 0.36 | 0.15 | t-Butyl acrylate | n-Butyl acrylate | 241 |
| Production Example 5 | B-27DM/Ni | 0.48 | 0.15 | t-Butyl acrylate | i-Butyl acrylate | 115 |
| Production Example 6 | B-27DM/Ni | 0.48 | 0.15 | t-Butyl acrylate | i-Butyl acrylate | 190 |
| Production Example 7 | B-27DM/Ni | 0.48 | 0.15 | t-Butyl acrylate | i-Butyl acrylate | 189 |
| Comparative Production Example 1 | B-27DM/Ni | 320 | 140 | t-Butyl acrylate | — | 138 |

| | Polymerization conditions | | | | | |
|---|---|---|---|---|---|---|
| | Comonomer 2 Concentration mmol/L | Ethylene partial pressure MPa | Temperature ° C. | Time min | Yield g | Catalytic efficiency g/mol |
| Production Example 1 | 66 | 0.8 | 95 | 510 | 75000 | 5.1E+04 |
| Production Example 2 | 60 | 3.0 | 90 | 92 | 62 | 1.3E+05 |
| Production Example 3 | 115 | 3.0 | 80 | 180 | 60 | 1.2E+05 |
| Production Example 4 | 72 | 3.0 | 90 | 88 | 58 | 1.6E+05 |

TABLE 1-continued

| | Copolymer precursor production | | | | | |
|---|---|---|---|---|---|---|
| Production Example 5 | 100 | 3.0 | 90 | 120 | 52 | 1.1E+05 |
| Production Example 6 | 22 | 3.0 | 90 | 55 | 65 | 1.4E+05 |
| Production Example 7 | 7 | 3.0 | 100 | 29 | 62 | 1.3E+05 |
| Comparative Production Example 1 | — | 0.8 | 100 | 240 | 41000 | 1.3E+05 |

TABLE 2

| | Copolymer precursor results | | | | | |
|---|---|---|---|---|---|---|
| | Comonomer 1 | Comonomer 2 | Comonomer 1 Content mol % | Comonomer 2 Content mol % | Melting point Tm °C. | Crystallinity % |
| Production Example 1 | t-Butyl acrylate | i-Butyl acrylate | 5.4 | 2.3 | 80.5 | 11.6 |
| Production Example 2 | t-Butyl acrylate | n-Butyl acrylate | 5.3 | 2.7 | 82.2 | 14.0 |
| Production Example 3 | t-Butyl acrylate | n-Butyl acrylate | 5.2 | 3.6 | 78.2 | 12.2 |
| Production Example 4 | t-Butyl acrylate | n-Butyl acrylate | 5.4 | 1.9 | 86.0 | 17.3 |
| Production Example 5 | t-Butyl acrylate | i-Butyl acrylate | 3.2 | 3.8 | 88.4 | 18.3 |
| Production Example 6 | t-Butyl acrylate | i-Butyl acrylate | 5.3 | 1.0 | 90.6 | 21.5 |
| Production Example 7 | t-Butyl acrylate | i-Butyl acrylate | 5.5 | 0.5 | 92.8 | 25.2 |
| Comparative Production Example 1 | t-Butyl acrylate | — | 5.6 | — | 94.1 | 27.2 |

| | Weight average molecular weight Mw*10$^{-4}$ | Molecular weight distribution parameter Mw/Mn | Number of methyl branches Branches/1000C | Number of ethyl branches Branches/1000C | Number of butyl branches Branches/1000C |
|---|---|---|---|---|---|
| Production Example 1 | 2.7 | 2.3 | Not detected | Not detected | Not detected |
| Production Example 2 | 2.9 | 1.9 | No data | No data | No data |
| Production Example 3 | 3.9 | 2.0 | 0.2 | Not detected | Not detected |
| Production Example 4 | 3.1 | 2.2 | 0.5 | Not detected | Not detected |
| Production Example 5 | 3.2 | 1.9 | 0.5 | Not detected | Not detected |
| Production Example 6 | 3.5 | 1.9 | 0.6 | Not detected | Not detected |
| Production Example 7 | 2.6 | 2.0 | 0.7 | Not detected | Not detected |
| Comparative Production Example 1 | 2.2 | 2.3 | 1.0 | Not detected | Not detected |

TABLE 3

| | Multi-component copolymer production | | | | | |
|---|---|---|---|---|---|---|
| | Base resin | Resin composition A/B/C mol/mol/mol | MFR 190 deg, 2.16 kg g/10 min | Melting point Tm °C. | Crystallinity % | Structural unit amount [Z] [B] + [C] mol % |
| Production Example 1 | Multi-component copolymer 1 | E/AA/iBA = 92.3/5.4/2.3 | 81 | 88 | 19 | 7.7 |
| Production Example 2 | Multi-component copolymer 2 | E/AA/nBA = 92.0/5.3/2.7 | no data | 87 | 20 | 8.0 |

TABLE 3-continued

Multi-component copolymer production

| | | | | | | |
|---|---|---|---|---|---|---|
| Production Example 3 | Multi-component copolymer 3 | E/AA/nBA = 91.2/5.2/3.6 | 41 | 83 | 17 | 8.8 |
| Production Example 4 | Multi-component copolymer 4 | E/AA/nBA = 92.7/5.4/1.9 | 34 | 90 | 23 | 7.3 |
| Production Example 5 | Multi-component copolymer 5 | E/AA/iBA = 93.0/3.2/3.8 | 68 | 91 | 22 | 7.0 |
| Production Example 6 | Multi-component copolymer 6 | E/AA/iBA = 93.7/5.3/1.0 | 33 | 96 | 27 | 6.3 |
| Production Example 7 | Multi-component copolymer 7 | E/AA/iBA = 94.0/5.5/0.5 | 73 | 98 | 30 | 6.0 |
| Comparative Production Example 1 | Comparative multi-component copolymer C1 | E/AA = 94.4/5.6 | 128 | 100 | 33 | 5.6 |
| Comparative Production Example 2 | Comparative multi-component copolymer C2 | E/MAA/iBA = 94.4/1.5/4.1 | 27 | 87 | 23 | 5.6 |

| | −3.74 × [Z] + 130 | Phase angle δ (G* = 0.1 MPa) ° | Number of methyl branches Branches/1000C | Number of ethyl branches Branches/1000C | Number of butyl branches Branches/1000C |
|---|---|---|---|---|---|
| Production Example 1 | 101 | 64 | Not detected | Not detected | Not detected |
| Production Example 2 | 100 | 70 | No data | No data | No data |
| Production Example 3 | 97 | 58 | 0.2 | Not detected | Not detected |
| Production Example 4 | 103 | 61 | 0.5 | Not detected | Not detected |
| Production Example 5 | 104 | 68 | 0.5 | Not detected | Not detected |
| Production Example 6 | 106 | 68 | 0.6 | Not detected | Not detected |
| Production Example 7 | 108 | 69 | 0.7 | Not detected | Not detected |
| Comparative Production Example 1 | 109 | 51 | 1.0 | Not detected | Not detected |
| Comparative Production Example 2 | 109 | 45 | Not detected | 5 | 9.5 |

TABLE 4

Multi-component copolymer results

| | Base resin | Resin composition A/B/C mol/mol/mol | Tensile modulus MPa | Tensile stress at break MPa | Tensile elongation at break % | Tensile impact strength kJ/m² |
|---|---|---|---|---|---|---|
| Production Example 1 | Multi-component copolymer 1 | E/AA/iBA = 92.3/5.4/2.3 | 52 | 26 | 636 | 497 |
| Production Example 2 | Multi-component copolymer 2 | E/AA/nBA = 92.0/5.3/2.7 | 45 | 25 | 546 | 705 |
| Production Example 3 | Multi-component copolymer 3 | E/AA/nBA = 91.2/5.2/3.6 | 35 | 31 | 606 | 1078 |
| Production Example 4 | Multi-component copolymer 4 | E/AA/nBA = 92.7/5.4/1.9 | 54 | 29 | 554 | 659 |
| Production Example 5 | Multi-component copolymer 5 | E/AA/iBA = 93.0/3.2/3.8 | 45 | 22 | 600 | 722 |
| Production Example 6 | Multi-component copolymer 6 | E/AA/iBA = 93.7/5.3/1.0 | 74 | 31 | 562 | 702 |
| Production Example 7 | Multi-component copolymer 7 | E/AA/iBA = 94.0/5.5/0.5 | 172 | 22 | 395 | 237 |
| Comparative Production Example 1 | Comparative multi-component copolymer C1 | E/AA = 94.4/5.6 | 301 | 15 | 179 | 120 |
| Comparative Production Example 2 | Comparative multi-component copolymer C2 | E/MAA/iBA = 94.4/1.5/4.1 | 26 | 16 | 636 | 575 |

<Production of an Ionomer>
1) Production of a Na Ion Source

First, 22 g of an ethylene-methacrylic acid (MAA) copolymer (product name: NUCREL N1050H, manufactured by: Dow-Mitsui Polychemicals Co., Ltd.) and 18 g of sodium carbonate were put in LABO PLASTOMILL: ROLLER MIXER R60 (product name, manufactured by Toyo Seiki Seisaku-sho, Ltd.) furnished with a small mixer (capacity 60 ml). They were kneaded for 3 minutes at 180° C. and 40 rpm, thereby producing a Na ion source.

2) Production of a Zn Ion Source

First, 21.8 g of the ethylene-methacrylic acid (MAA) copolymer (product name: NUCREL N1050H, manufactured by: Dow-Mitsui Polychemicals Co., Ltd.), 18 g of zinc oxide and 0.2 g of zinc stearate were put in LABO PLASTOMILL: ROLLER MIXER R60 (product name, manufactured by Toyo Seiki Seisaku-sho, Ltd.) furnished with the small mixer (capacity 60 ml). They were kneaded for 3 minutes at 180° C. and 40 rpm, thereby producing a Zn ion source.

(Example 1): Production of an E/AA/iBA-Based Ternary Ionomer

First, 40 g of the E/AA/iBA copolymer 1 was put in LABO PLASTOMILL: ROLLER MIXER R60 (product name, manufactured by Toyo Seiki Seisaku-sho, Ltd.) furnished with the small mixer (capacity 60 ml). The E/AA/iBA copolymer 1 was kneaded for 3 minutes at 160° C. and 40 rpm and dissolved. Then, the Na ion source was added to give a desired neutralization degree. They were kneaded for 5 minutes at 250° C. and 40 rpm.

An IR spectrum of the obtained resin showed that peaks around 1700 $cm^{-1}$ decreased, which are peaks derived from the carbonyl group of carboxylic acid (a dimer), and peaks around 1560 $cm^{-1}$ increased, which are peaks derived from the carbonyl group of a carboxylic acid salt group. From the amount of the decrease in the peaks around 1700 $cm^{-1}$, which are peaks derived from the carbonyl group of carboxylic acid (a dimer), it was confirmed that an ionomer having a desired neutralization degree was produced. The physical properties of the obtained ionomer are shown in Tables 5 and 6.

(Examples 2 to 8): Production of E/AA/iBA-Based Ternary Ionomers

E/AA/iBA-based ternary ionomers different in metal ion species or neutralization degree were produced in the same manner as Example 1, except that the Na or Zn ion source was appropriately adjusted and added to give a desired neutralization degree. The physical properties of the obtained ionomers are shown in Tables 5 and 6.

(Examples 9 to 11): Production of E/AA/nBA-Based Ternary Ionomers

E/AA/nBA-based ternary ionomers different in base resin and neutralization degree were produced in the same manner as Example 1, except that the E/AA/nBA copolymers 2 to 4 were used as a base resin, and the Na ion source was appropriately adjusted and added to give a desired neutralization degree. The physical properties of the obtained ionomers are shown in Tables 5 and 6.

(Examples 12 to 14): Production of E/AA/iBA-Based Ternary Ionomers

E/AA/iBA-based ternary ionomers different in base resin and neutralization degree were produced in the same manner as Example 1, except that the E/AA/iBA copolymers 5 to 7 were used as a base resin, and the Na ion source was appropriately adjusted and added to give a desired neutralization degree. The physical properties of the obtained ionomers are shown in Tables 5 and 6.

(Comparative Example 1): Production of an E/AA-Based Binary Ionomer

An E/AA-based binary ionomer different in base resin and neutralization degree was produced in the same manner as Example 1, except that the E/AA copolymer C1, which is a comparative multi-component copolymer, was used as a base resin, and the Na ion source was appropriately adjusted and added to give a desired neutralization degree. The physical properties of the obtained ionomer are shown in Tables 7 and 8.

(Comparative Examples 2 and 3): Production of E/MAA/iBA-Based Ternary Ionomers

E/MAA/iBA-based ternary ionomers different in base resin and neutralization degree were produced in the same manner as Example 1, except that the E/MAA/iBA copolymer C2, which is a comparative multi-component copolymer, was used as a base resin, and the Na ion source was appropriately adjusted and added to give a desired neutralization degree. The physical properties of the obtained ionomers are shown in Tables 7 and 8.

(Reference Example 1): E/MAA-Based Binary Ionomer

As a reference ionomer, an ionomer resin (product name: HIMILAN HIM1605, manufactured by: Dow-Mitsui Polychemicals Co., Ltd.) was used, which is an ethylene-methacrylic acid-sodium methacrylate copolymer produced by a high-pressure radical polymerization process. The physical properties thereof are shown in Tables 7 and 8.

(Reference Example 2): E/MAA-Based Binary Ionomer

As a reference ionomer, an ionomer resin (product name: HIMILAN HIM1707, manufactured by: Dow-Mitsui Polychemicals Co., Ltd.) was used, which is an ethylene-methacrylic acid-sodium methacrylate copolymer produced by a high-pressure radical polymerization process. The physical properties thereof are shown in Tables 7 and 8.

TABLE 5

| | Base resin: Multi-component copolymer | Resin composition A/B/C mol/mol/mol | Neutralization degree Na$^+$/(M)AA mol % | Neutralization degree 2 × Zn$^{2+}$/(M)AA mol % | MFR 190 deg, 2.16 kg g/10 min | Melting point Tm °C. | Phase angle δ (G* = 0.1 MPa) ° |
|---|---|---|---|---|---|---|---|
| Example 1 | 1 | E/AA/iBA = 92.3/5.4/2.3 | 20 | — | 19 | 88 | 57 |
| Example 2 | | E/AA/iBA = 92.3/5.4/2.3 | 30 | — | 11 | 88 | 57 |
| Example 3 | | E/AA/iBA = 92.3/5.4/2.3 | 45 | — | 3.5 | 86 | 55 |
| Example 4 | | E/AA/iBA = 92.3/5.4/2.3 | 60 | — | 1.6 | 84 | 54 |
| Example 5 | | E/AA/iBA = 92.3/5.4/2.3 | — | 10 | 33 | 85 | 59 |
| Example 6 | | E/AA/iBA = 92.3/5.4/2.3 | — | 20 | 10 | 84 | 55 |
| Example 7 | | E/AA/iBA = 92.3/5.4/2.3 | — | 40 | 0.9 | 83 | 55 |
| Example 8 | | E/AA/iBA = 92.3/5.4/2.3 | — | 60 | 0.2 | 82 | 54 |
| Example 9 | 2 | E/AA/nBA = 92.0/5.3/2.7 | 32 | — | 8.0 | 87 | 60 |
| Example 10 | 3 | E/AA/nBA = 91.2/5.2/3.6 | 40 | — | 1.6 | 82 | 59 |
| Example 11 | 4 | E/AA/nBA = 92.7/5.4/1.9 | 30 | — | 5.6 | 91 | 59 |
| Example 12 | 5 | E/AA/iBA = 93.0/3.2/3.8 | 20 | — | 26 | 92 | 64 |
| Example 13 | 6 | E/AA/iBA = 93.7/5.3/1.0 | 20 | — | 10 | 96 | 65 |
| Example 14 | 7 | E/AA/iBA = 94.0/5.5/0.5 | 20 | — | 14 | 99 | 65 |

TABLE 6

| | Base resin: Multi-component copolymer | Resin composition A/B/C mol/mol/mol | Neutralization degree Na$^+$/(M)AA mol % | Neutralization degree 2 × Zn$^{2+}$/(M)AA mol % | Tensile modulus MPa | Tensile stress at break MPa | Crystallinity % | Al adhesion strength N/10 mm |
|---|---|---|---|---|---|---|---|---|
| Example 1 | 1 | E/AA/iBA = 92.3/5.4/2.3 | 20 | — | 69 | 37 | 19 | 4.1 |
| Example 2 | | E/AA/iBA = 92.3/5.4/2.3 | 30 | — | 97 | 41 | 17 | 3.4 |
| Example 3 | | E/AA/iBA = 92.3/5.4/2.3 | 45 | — | 113 | 42 | 16 | 3.8 |
| Example 4 | | E/AA/iBA = 92.3/5.4/2.3 | 60 | — | 113 | 43 | 10 | 3.7 |
| Example 5 | | E/AA/iBA = 92.3/5.4/2.3 | — | 10 | 54 | 34 | 18 | 14.7 |
| Example 6 | | E/AA/iBA = 92.3/5.4/2.3 | — | 20 | 65 | 35 | 17 | 14.9 |
| Example 7 | | E/AA/iBA = 92.3/5.4/2.3 | — | 40 | 93 | 38 | 15 | 6.9 |
| Example 8 | | E/AA/iBA = 92.3/5.4/2.3 | — | 60 | 114 | 41 | 12 | 2.9 |
| Example 9 | 2 | E/AA/nBA = 92.0/5.3/2.7 | 32 | — | 129 | 39 | 19 | 3.9 |
| Example 10 | 3 | E/AA/nBA = 91.2/5.2/3.6 | 40 | — | 99 | 55 | 15 | 5.1 |
| Example 11 | 4 | E/AA/nBA = 92.7/5.4/1.9 | 30 | — | 157 | 39 | 24 | 5.6 |
| Example 12 | 5 | E/AA/iBA = 93.0/3.2/3.8 | 20 | — | 59 | 27 | 22 | 9.8 |
| Example 13 | 6 | E/AA/iBA = 93.7/5.3/1.0 | 20 | — | 230 | 33 | 27 | 2.9 |
| Example 14 | 7 | E/AA/iBA = 94.0/5.5/0.5 | 20 | — | 351 | 27 | 30 | 1.9 |

TABLE 7

| | Base resin: Comparative multi-component copolymer | Resin composition A/B/C mol/mol/mol | Neutralization degree Na$^+$/(M)AA mol % | Neutralization degree 2 × Zn$^{2+}$/(M)AA mol % | MFR 190 deg, 2.16 kg g/10 min | Melting point Tm °C. | Phase angle δ (G* = 0.1 MPa) ° |
|---|---|---|---|---|---|---|---|
| Comparative Example 1 | C1 | E/AA = 94.4/5.6 | 30 | — | 15 | 101 | 62 |
| Comparative Example 2 | C2 | E/MAA/iBA = 94.4/1.5/4.1 | 30 | — | 7.9 | 86 | 44 |
| Comparative Example 3 | C2 | E/MAA/iBA = 94.4/1.5/4.1 | 60 | — | 2.1 | 86 | 44 |
| Reference Example 1 | — | E/MAA = 94.6/5.4 | 30 | — | 2.8 | 91 | 46 |
| Reference Example 2 | — | E/MAA = 94.6/5.4 | 54 | — | 0.9 | 86 | 47 |

TABLE 8

| | Base resin: Comparative multi-component copolymer | Resin composition A/B/C mol/mol/mol | Neutralization degree | | Tensile modulus MPa | Tensile stress at break MPa | Crystal-linity % | Al adhesion strength N/10 mm |
|---|---|---|---|---|---|---|---|---|
| | | | $Na^+$/(M)AA mol % | $2 \times Zn^{2+}$/(M)AA mol % | | | | |
| Comparative Example 1 | C1 | E/AA = 94.4/5.6 | 30 | — | 515 | 22 | 32 | 1.5 |
| Comparative Example 2 | C2 | E/MAA/iBA = 94.4/1.5/4.1 | 30 | — | 30 | 17 | 18 | No data |
| Comparative Example 3 | C2 | E/MAA/iBA = 94.4/1.5/4.1 | 60 | — | 34 | 21 | 17 | No data |
| Reference Example 1 | — | E/MAA = 94.6/5.4 | 30 | — | 250 | 40 | 18 | 1.7 |
| Reference Example 2 | — | E/MAA = 94.6/5.4 | 54 | — | 233 | 40 | 10 | 0.6 |

FIG. 1 is a view showing a relationship between the neutralization degree and tensile modulus (flexibility) of the ionomers of Examples 1 to 14 and Comparative Examples 1 to 3.

Figure 2:
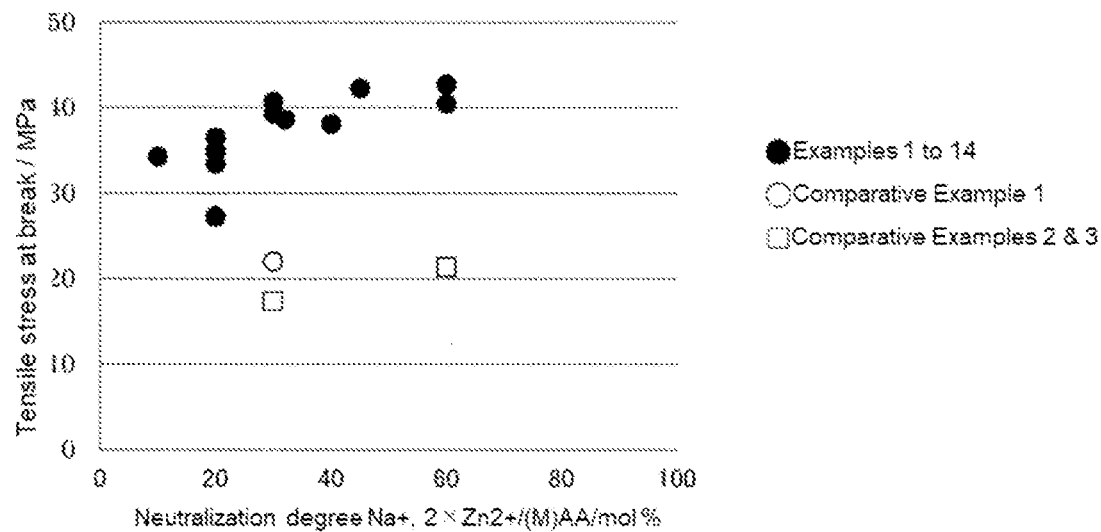
FIG. 2 is a view showing a relationship between the neutralization degree and tensile stress at break (strength) of the ionomers of Examples 1 to 14 and Comparative Examples 1 to 3.

FIG. 2 is a view showing a relationship between the neutralization degree and tensile stress at break (strength) of the ionomers of Examples 1 to 14 and Comparative Examples 1 to 3.

Figure 3:
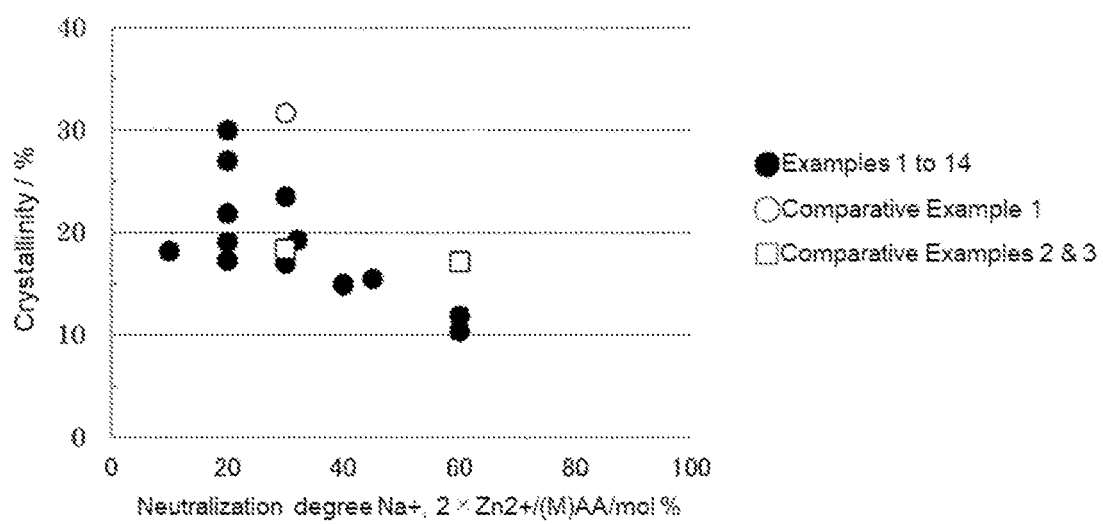
FIG. 3 is a view showing a relationship between the neutralization degree and crystallinity (transparency) of the ionomers of Examples 1 to 14 and Comparative Examples 1 to 3.

FIG. 3 is a view showing a relationship between the neutralization degree and crystallinity (transparency) of the ionomers of Examples 1 to 14 and Comparative Examples 1 to 3.

Consideration of the Results of Examples and Comparative Examples

[Comparison of the Binary Ionomer with the Ternary Ionomer in Conventional Ionomers]

The ionomers of Reference Examples 1 and 2 and Comparative Examples 2 and 3 in Tables 7 and 8 are conventional ionomers, and they are ionomers each composed of the base resin produced by the high-pressure radical polymerization method and the metal ion source. Accordingly, the molecular structure thereof contains many long chain branches, and the phase angle δ at which the absolute value G* of the complex modulus is 0.1 MPa (G*=0.1 MPa) is less than 50°.

In Table 8, when the binary ionomer of Reference Example 1 and the ternary ionomer of Comparative Example 2 are compared, while their neutralization degrees are both 30%, the ternary ionomer of Comparative Example 2 is lower in tensile modulus and tensile stress at break than the binary ionomer of Reference Example 1. Accordingly, while Comparative Example 2 is better in flexibility than Reference Example 1, it is inferior in strength. In a similar way, when the ternary ionomer of Comparative Example 3 and the binary ionomer of Reference Example are compared, they have the same level of neutralization degree. However, while the ternary ionomer of Comparative Example 3 is better in flexibility than the binary ionomer of Reference Example 2, it is inferior in strength.

This result indicates that for the conventional multi-component ionomer that the phase angle δ (G*=0.1 MPa) is less than 50°, it is difficult to enhance both the flexibility and strength at the same time.

[Comparison of the Ternary Ionomers of the Present Invention with the Substantially Straight Chain Binary Ionomer]

The ionomer of Comparative Example 1 in Tables 7 and 8 and the ionomers of Examples 1 to 14 in Tables 5 and 6 are ionomers each composed of the base resin produced by the specific transition metal catalyst, and the metal ion source. Accordingly, the molecular structure thereof is a substantially straight chain structure, and the phase angle δ (G*=0.1 MPa) is 50° or more.

When the binary ionomer of Comparative Example 1 in Table 8 and the ternary ionomer of Example 2 in Table 6 are compared, while their neutralization degrees are both 30%, the ternary ionomer of Example 2 is lower in tensile modulus and crystallinity and higher in tensile stress at break than the binary ionomer of Comparative Example 1. Accordingly, the ternary ionomer of Example 2 is better in flexibility, strength and transparency than the binary ionomer of Comparative Example 1. Also, when the binary ionomer of Comparative Example 1 in Table 8 and the ternary ionomer of Example 2 in Table 6 are compared, while their neutralization degrees are both 30%, the ternary ionomer of Example 2 is much higher in adhesion strength to aluminum (Al) than the binary ionomer of Comparative Example 1. Accordingly, the ternary ionomer of Example 2 has better adhesion performance to different kinds of materials with different polarities than the binary ionomer of Comparative Example 1.

This result indicates that the multi-component ionomer of the present invention that the phase angle δ (G*=0.1 MPa) is 50° or more, is relatively well-balanced between flexibility, strength and transparency compared to the binary ionomer, and it has excellent adhesion performance to different kinds of highly-polar materials.

[Comparison of the Ternary Ionomers of the Present Invention with the Conventional Ternary Ionomers]

When the ternary ionomer of the present invention of Example 2 in Table 6 and the conventional ternary ionomer of Comparative Example 2 in Table 8 are compared, their neutralization degrees are both 30%. While Example 2 is higher in tensile modulus than Comparative Example 2, Example 2 has desired flexibility (tensile modulus) and is higher in tensile stress at break and lower in crystallinity than Comparative Example 2. Also, when Example 4 and Comparative Example 3 are compared, their neutralization degrees are both 60%. While Example 4 is higher in tensile modulus than Comparative Example 3, Example 4 has desired flexibility (tensile modulus) and is higher in tensile stress at break and lower in crystallinity than Comparative Example 3.

Accordingly, Examples 2 and 4 are relatively well-balanced between flexibility, strength and transparency compared to Comparative Examples 2 and 3.

In the present invention, the desired tensile modulus may be a tensile modulus of at least 400 MPa or less, preferably 300 MPa or less, and particularly preferably 230 MPa or less.

This result indicates that the multi-component ionomer of the present invention that the phase angle δ (G*=0.1 MPa) is 50° or more, is relatively well-balanced between flexibility, strength and transparency compared to the conventional ternary ionomer.

[Composition, Neutralization Degree and Metal Ion Species of the Ternary Ionomers of the Present Invention]

The ionomers of Examples 1 to 14 in Tables 5 and 6 are each the ternary ionomer of the present invention, which is composed of the base resin produced by the specific transition metal catalyst, and the metal ion source. The molecular structure thereof is a substantially straight chain structure, and the phase angle δ (G*=0.1 MPa) is 50° or more.

The ionomers of Examples 1 to 14 are ionomers different in the composition of the base resin, neutralization degree or metal ion species. However, they all have desired flexibility (tensile modulus), desired strength (tensile stress at break), desired transparency (crystallinity) and desired adhesion performance (Al adhesion strength).

This result indicates that the multi-component ionomer of the present invention that the phase angle δ (G*=0.1 MPa) is 50° or more, is relatively well-balanced between flexibility, strength and transparency, and it has excellent adhesion performance to different kinds of highly-polar materials, irrespective of the composition of the base resin, neutralization degree or metal ion species.

In the present invention, the desired tensile modulus may be at least 400 MPa or less, preferably 300 MPa or less, and particularly preferably 230 MPa or less; the desired tensile stress at break may be at least 25 MPa or more and preferably 30 MPa or more; the desired crystallinity may be at least 30% or less, preferably 27% or less, more preferably 24% or less, and particularly preferably 22% or less; and the desired Al adhesion strength may be at least 1.8 N/10 mm or more, preferably 1.9 N/10 mm or more, more preferably 2.0 N/10 mm or more, and particularly preferably 2.5 N/10 mm or more.

INDUSTRIAL APPLICABILITY

Compared to a binary ionomer and conventional multi-component ionomers, the multi-component ionomer of the present invention is well-balanced between flexibility (tensile modulus), strength (tensile stress at break) and transparency (crystallinity), and it has excellent adhesion performance to different kinds of highly-polar materials.

The invention claimed is:

1. A multi-component ionomer, wherein, in a multi-component copolymer (D) comprising, as essential constitutional units,
    a structural unit (A) derived from at least one selected from the group consisting of ethylene and an α-olefin containing 3 to 20 carbon atoms,
    a structural unit (B) derived from a monomer containing at least one selected from the group consisting of a carboxy group and a dicarboxylic anhydride group, and
    a structural unit (C) derived from an acyclic monomer represented by the following general formula (1), at least a part of at least one selected from the group consisting of a carboxy group and a dicarboxylic anhydride group of the structural unit (B) is converted into a metal-containing carboxylate containing at least one metal ion selected from the group consisting of Groups 1, 2 and 12 of the periodic table, and wherein a phase angle δ at which an absolute value G* of a complex modulus measured with a rotational rheometer is 0.1 MPa (G*=0.1 MPa) is from 50 degrees to 75 degrees:

where
    $T^1$ to $T^3$ are each independently
        a hydrogen atom,
        a hydrocarbon group containing 1 to 20 carbon atoms,
        a hydrocarbon group containing 1 to 20 carbon atoms and substituted with a hydroxyl group,
        a hydrocarbon group containing 2 to 20 carbon atoms and substituted with an alkoxy group containing 1 to 20 carbon atoms,
        a hydrocarbon group containing 3 to 20 carbon atoms and substituted with an ester group containing 2 to 20 carbon atoms,
        a hydrocarbon group containing 1 to 20 carbon atoms and substituted with a halogen atom,
        an alkoxy group containing 1 to 20 carbon atoms,
        an aryl group containing 6 to 20 carbon atoms,
        an ester group containing 2 to 20 carbon atoms,
        a silyl group containing 3 to 20 carbon atoms,
        a halogen atom or
        a cyano group, and
    $T^4$ is
        a hydrocarbon group containing 1 to 20 carbon atoms and substituted with a hydroxyl group,
        a hydrocarbon group containing 2 to 20 carbon atoms and substituted with an alkoxy group containing 1 to 20 carbon atoms,
        a hydrocarbon group containing 3 to 20 carbon atoms and substituted with an ester group containing 2 to 20 carbon atoms,
        a hydrocarbon group containing 1 to 20 carbon atoms and substituted with a halogen atom,
        an alkoxy group containing 1 to 20 carbon atoms,
        an aryl group containing 6 to 20 carbon atoms,
        an ester group containing 2 to 20 carbon atoms,
        a silyl group containing 3 to 20 carbon atoms,
        a halogen atom, or
        a cyano group.

2. The multi-component ionomer according to claim 1, wherein a melting point (Tm) (° C.) observed by differential scanning calorimetry (DSC) is from 50° C. to 140° C.

3. The multi-component ionomer according to claim 1, wherein a number of methyl branches of the multi-component copolymer (D) calculated by $^{13}$C-NMR is 50 or less per 1,000 carbon atoms.

4. The multi-component ionomer according to claim 1, wherein the structural unit (C) contained in the multi-component copolymer (D) is 0.1 mol % or more and 20.0 mol % or less.

5. The multi-component ionomer according to claim 1, wherein the structural unit (B) contained in the multi-component copolymer (D) is 2.0 mol % or more and 20.0 mol % or less.

6. The multi-component ionomer according to claim 1, wherein the structural unit (A) is a structural unit derived from ethylene.

7. The multi-component ionomer according to claim 1, wherein $T^1$ to $T^3$ are all hydrogen atoms.

8. The multi-component ionomer according to claim 1, wherein $T^4$ is an ester group containing 2 to 20 carbon atoms.

9. The multi-component ionomer according to claim 1, wherein the multi-component copolymer (D) is produced in the presence of a transition metal catalyst containing a transition metal of Groups 8 to 11 of the periodic table.

10. The multi-component ionomer according to claim 9, wherein the transition metal catalyst is a transition metal catalyst composed of phosphorus sulfonic acid or phosphorus phenol ligand and nickel or palladium.

* * * * *